(12) United States Patent
Sheikh et al.

(10) Patent No.: US 10,713,333 B2
(45) Date of Patent: Jul. 14, 2020

(54) FAST FOURIER TRANSFORM ARCHITECTURE

(71) Applicant: Intel Corporation, Santa Clara, CA (US)

(72) Inventors: Farhana Sheikh, Portland, OR (US); Ankit Sharma, Hillsboro, OR (US); Jaydeep Kulkarni, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/777,249

(22) PCT Filed: Dec. 21, 2015

(86) PCT No.: PCT/US2015/066963
§ 371 (c)(1),
(2) Date: May 18, 2018

(87) PCT Pub. No.: WO2017/111881
PCT Pub. Date: Jun. 29, 2017

(65) Prior Publication Data
US 2018/0336161 A1    Nov. 22, 2018

(51) Int. Cl.
*G06F 17/14*    (2006.01)
*H04L 27/26*    (2006.01)

(52) U.S. Cl.
CPC .......... *G06F 17/142* (2013.01); *H04L 27/263* (2013.01)

(58) Field of Classification Search
CPC . G06F 17/142; G06F 17/14–147; H04L 27/26
USPC .......................... 708/409, 400–405; 370/210
See application file for complete search history.

(56) References Cited

U.S. PATENT DOCUMENTS

| 3,512,008 A | * | 5/1970 | Dann | ........................ H03K 7/02 327/379 |
| 4,241,411 A | | 12/1980 | Krasner et al. | |
| 5,585,744 A | * | 12/1996 | Runas | ............ H03K 19/018521 326/86 |

(Continued)

OTHER PUBLICATIONS

F. Sheikh, et al., Adaptive and Multi-Mode Baseband Systems for Next Generation Wireless Communication, Intel Corporation, Asilomar 2017, IEEE p. 1499-1503, 2017 (Year: 2017).*

(Continued)

*Primary Examiner* — Andrew Caldwell
*Assistant Examiner* — Emily E Larocque
(74) *Attorney, Agent, or Firm* — Kowert, Hood, Munyon, Rankin & Goetzel, P.C.

(57) ABSTRACT

A calculation circuit for calculating a transform of an input sequence may include a plurality of butterfly computation circuits configured to perform a plurality of butterfly computations and to produce a plurality of outputs during each of a plurality of computation stages, a wired routing network configured to route a first plurality of outputs of the plurality of butterfly computation circuits from a first computation stage of the plurality of computation stages as input to the plurality of butterfly computation circuits during a second computation stage of the plurality of computation stages according to a reconfigurable routing configuration, and routing control circuitry configured to modify the reconfigurable routing configuration for a third computation stage of the plurality of computation stages.

25 Claims, 12 Drawing Sheets

(56) References Cited

U.S. PATENT DOCUMENTS

| | | | | |
|---|---|---|---|---|
| 2004/0001557 A1* | 1/2004 | Sunwoo | ............... | G06F 17/142 375/295 |
| 2004/0243656 A1* | 12/2004 | Sung | ..................... | G06F 17/142 708/404 |
| 2005/0251542 A1* | 11/2005 | Hennedy | ............... | G06F 17/142 708/300 |
| 2006/0143258 A1* | 6/2006 | Teng | ..................... | G06F 17/142 708/404 |
| 2009/0132794 A1 | 5/2009 | Ebert et al. | | |
| 2011/0099216 A1 | 4/2011 | Sun et al. | | |
| 2012/0254273 A1* | 10/2012 | Asanaka | ............... | G06F 17/142 708/404 |
| 2014/0028738 A1 | 1/2014 | Nathan et al. | | |
| 2014/0089370 A1* | 3/2014 | Xie | ...................... | G06F 17/142 708/409 |

OTHER PUBLICATIONS

IEEE Std 802.11, "Part 11: Wireless LAN Medium Access Control (MAC) and Physical Layer (PHY) specifications High-speed Physical Layer in the 5 GHz Band", 1999, reaffirmed 2003, 91 pages, IEEE Std 802.11a-1999.

Sean Coffey et al., "Joint Proposal: High throughput extension to the 802.11 Standard: PHY", IEEE P802.11 Wireless LANs, Jan. 2006, 83 pages, IEEE 802.11-05/1102r4.

Anuj Batra et al., "Multi-band OFDM Physical Layer Proposal for IEEE 802.15 Task Group 3a", IEEE P802.15 Wireless Personal Area Networks, Mar. 2004, 66 pages, IEEE P802.15-03/268r3.

Anuj Batra et al., "Multi-band OFDM Physical Layer Proposal for IEEE 802.15 Task Group 3a", IEEE P802.15 Wireless Personal Area Networks, Nov. 2003, 69 pages, IEEE P802.15-03/268r2.

Chen-Fong Hsiao et al., "A Generalized Mixed-Radix Algorithm for Memory-Based FFT Processors", IEEE Transactions on Circuits and Systems II: Express Briefs, Jan. 2010, pp. 26-30, vol. 57, No. 1.

Byung G. Jo et al., "New Continuous-Flow Mixed-Radix (CFMR) FFT Processor Using Novel In-Place Strategy", IEEE Transactions on Circuits and Systems—I: Regular Papers, May 2005, pp. 911-919, vol. 52, No. 5.

Youn-Seog Chang et al., "An Enhanced Memory Assignment Scheme for Memory-Based FFT Processor", IEICE Trans. Fundamentals, Nov. 2004, pp. 3020-3024, vol. E87—A, No. 11.

Shousheng He et al., "Designing Pipeline FFT Processor for OFDM (de)Modulation", Proc. URSI Int.Symp. Signals, Systems, and Electronics, Oct. 1998, pp. 257-262, vol. 29.

Shousheng He et al., "Design and Implementation of a 1024-point Pipeline FFT Processor", IEEE 1998 Custom Integrated Circuits Conference, 1998, pp. 131-134.

John G. Proakis et al., "Efficient Computation of the DFT: Fast Fourier Transform Algorithms", Digital Signal Processing Principles, Algorithms, and Applications Third Edition, 1996, pp. 448-499, Prentice-Hall Int., Inc., New Jersey, U.S.A.

Yu-Wei Lin et al., A 1-GS/s FFT/IFFT Processor for UWB Applications, IEEE Journal of Solid-State Circuits, Aug. 2005, pp. 1726-1735, vol. 40, No. 8.

Shen-Jui Huang et al., "A Green FFT Processor with 2.5-GS/s for IEEE 802.15.3c (WPANs)", Green Circuits and Systems (ICGCS), 2010 International Conference, Jun. 2010, pp. 9-13.

Chia-Hsiang Yang et al., "Power and Area Minimization of Reconfigurable FFT Processors: A 3GPP-LTE Example", IEEE Journal of Solid-State Circuits, Mar. 2012, pp. 757-768, vol. 47, No. 3.

Alice Wang et al., "A 180-mV Subthreshold FFT Processor Using a Minimum Energy Design Methodology", IEEE Journal of Solid-State Circuits, Jan. 2005, pp. 310-319, vol. 40, No. 1.

International Search Report received for International Application No. PCT/US2015/066963, dated Aug. 24, 2016, 13 pages (Reference Purpose Only).

Augusta Sophy Beulet Paul et al., "Low power reconfigurable FP-FFT core with an array of folded DA butterflies", EURASIP Journal on Advances in Signal Processing, Dec. 2014, 17 pages.

* cited by examiner

FIG 4

| CLK | m_sel_1 | m_sel_2 | d_sel | Operations | reg1 | reg2 | reg3 | reg4 | reg5 | reg6 | reg7 | reg8 |
|---|---|---|---|---|---|---|---|---|---|---|---|---|
| 1 | 1 | 0 | 00 | $b0=x[0]+x[4]$, $b4=(x[0]-x[4])W_8^0$ | b0 | b4 | b1 | b5 | b2 | b6 | b3 | b8 |
|   |   |   |   | $b1=x[1]+x[5]$, $b5=(x[0]-x[4])W_8^1$ |   |   |   |   |   |   |   |   |
|   |   |   |   | $b2=x[2]+x[6]$, $b6=(x[0]-x[4])W_8^2$ |   |   |   |   |   |   |   |   |
|   |   |   |   | $b3=x[3]+x[7]$, $b7=(x[0]-x[4])W_8^3$ |   |   |   |   |   |   |   |   |
| 2 | 0 | 0 | 01 | $a0=b0+b2$, $a2=(b0-b2)W_8^0$ | a0 | a2 | a1 | a3 | a4 | a6 | a5 | a7 |
|   |   |   |   | $a1=b1+b3$, $a3=(b1-b3)W_8^2$ |   |   |   |   |   |   |   |   |
|   |   |   |   | $a4=b4+b6$, $a6=(b4-b6)W_8^0$ |   |   |   |   |   |   |   |   |
|   |   |   |   | $a5=b5+b7$, $a7=(b5-b7)W_8^2$ |   |   |   |   |   |   |   |   |
| 3 | 0 | 0 | 10 | $X[0]=a0+a1$, $X[4]=(a0-a1)W_8^0$ | X[0] | X[4] | X[2] | X[6] | X[1] | X[5] | X[3] | X[7] |
|   |   |   |   | $X[2]=a2+a3$, $X[6]=(a2-a3)W_8^0$ |   |   |   |   |   |   |   |   |
|   |   |   |   | $X[1]=a4+a5$, $X[5]=(a4-a5)W_8^0$ |   |   |   |   |   |   |   |   |
|   |   |   |   | $X[3]=a6+a7$, $X[7]=(a6-a7)W_8^0$ |   |   |   |   |   |   |   |   |
| 4 | 0 | 1 | 11 |   | X[0] | X[1] | X[2] | X[3] | X[4] | X[5] | X[6] | X[7] |

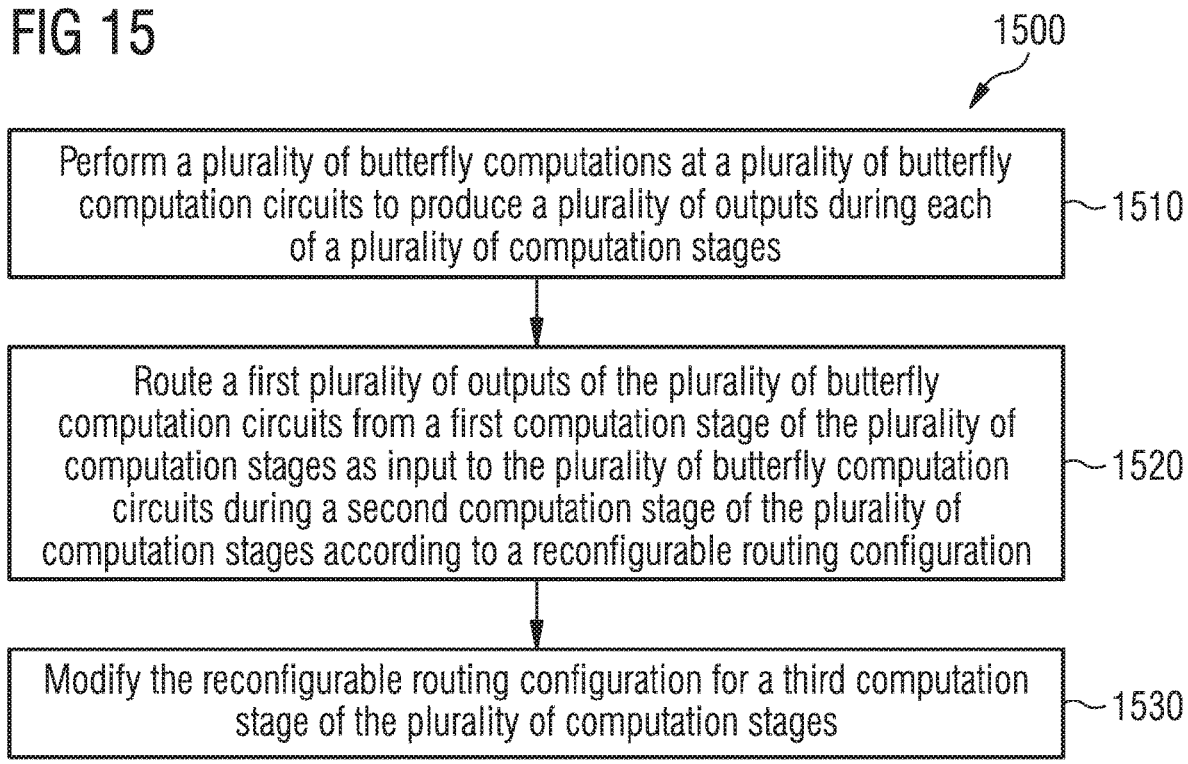
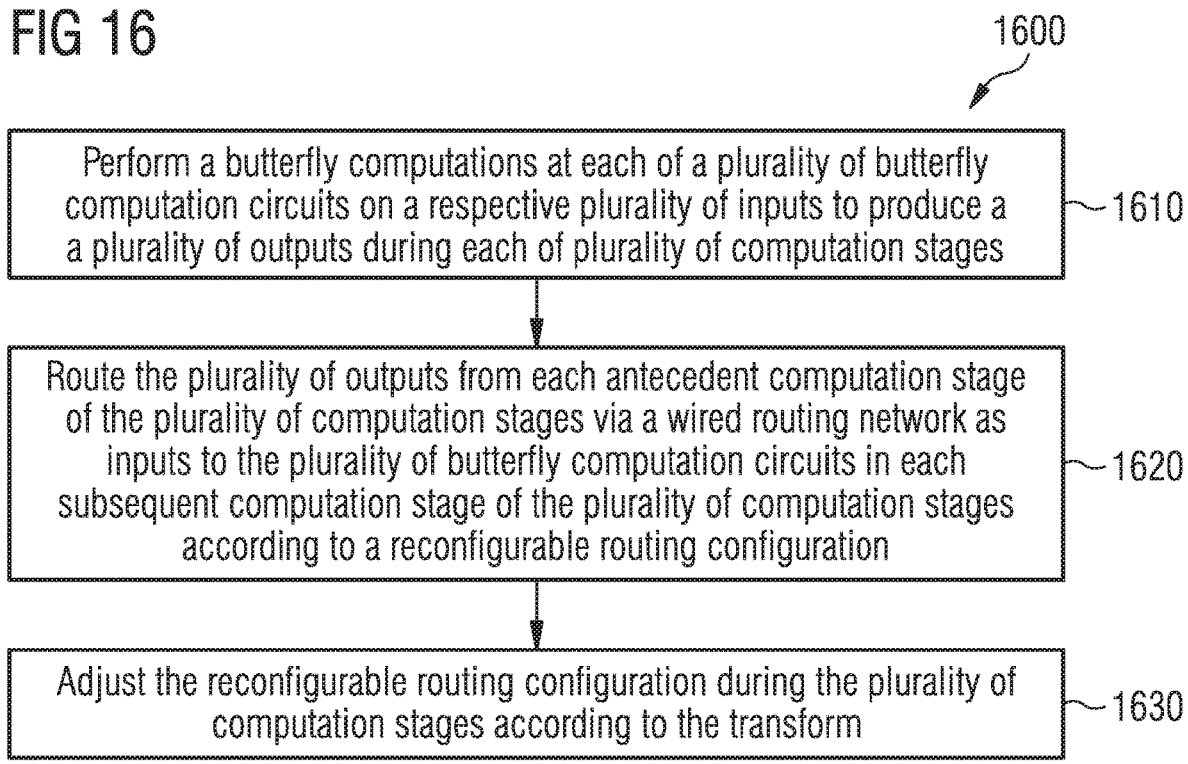

FAST FOURIER TRANSFORM ARCHITECTURE

CROSS-REFERENCE TO RELATED APPLICATIONS

This application is a national stage entry according to 35 U.S.C. 371 of PCT Application Serial No. PCT/US2015/066963, which was filed Dec. 21, 2015, and is incorporated herein by reference in its entirety.

TECHNICAL FIELD

Various embodiments relate generally to methods and calculation circuits for performing Fast Fourier Transforms (FFTs).

BACKGROUND

Increasing demand for real-time and high-rate multimedia services has resulted in numerous high-rate wireless communication systems. Many recent wireless communication systems have adopted Orthogonal Frequency Division Multiplexing (OFDM) as a multiplexing scheme due to its robustness against frequency-selective fading and narrowband interference. Such OFDM systems employ Discrete Fourier Transforms to multiplex data onto multiple orthogonal subcarriers, and accordingly require forward DFT and Inverse DFT (IDFT) processors at receivers and transmitters, respectively. In order to reduce the computational complexity, OFDM systems may conventionally implement Fast Fourier Transform (FFT) algorithms in place of such DFT computations. High-throughput and low-latency FFT engines have thus become essential components in many wireless schemes such as those based on OFDM that rely on DFT operations.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 shows a table illustrating signal values of the FFT computation circuit of FIG. 3;

FIG. 15 shows a first method for performing a transform on an input sequence; and FIG. 16 shows a second method for performing a transform on an input sequence.

DESCRIPTION

Figure 1:
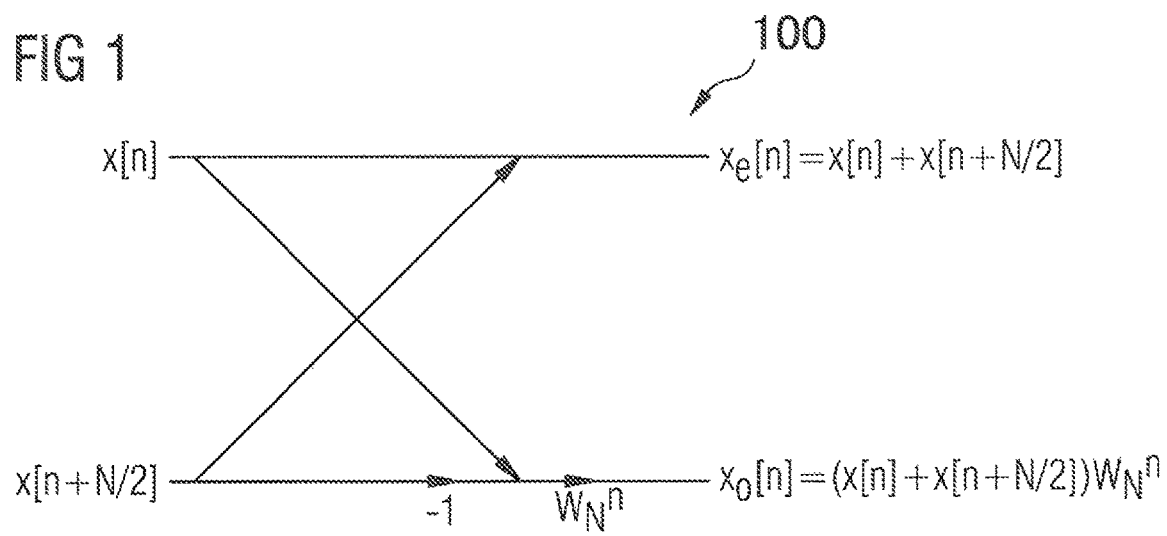
FIG. 1 shows a diagram of a Decimation in Frequency (DIF) Fast Fourier Transform (FFT) butterfly computation.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include GSM, UMTS, LTE, LTE-Advanced (LTE-A), CDMA, WCDMA, LTE-A, General Packet Radio Service (GPRS), Enhanced Data Rates for GSM Evolution (EDGE), High Speed Packet Access (HSPA), HSPA Plus (HSPA+), and other similar radio communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section).

As utilized herein, the term "radio idle mode" or "radio idle state" used in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct and indirect transmission. Similarly, the term "receive" encompasses both direct and indirect reception unless explicitly specified.

Demand for high throughput and low latency Fast Fourier Transform (FFT) processors has increased as a result of the recent emergence of FFT-based Orthogonal Frequency Division Multiplexing (OFDM) systems such as Long Term Evolution (LTE), Wireless Local Area Networks (WLAN), and Ultra Wide Band (UWB). Various FFT engines have been proposed for a variety of different applications, such as pipelined and memory-based FFT architectures. While memory-based solutions offer higher area efficiency and reduced power compared to pipelined approaches, memory-based designs require higher hardware complexity in order to avoid read-conflicts from memory components. Both pipelined and memory-based FFT architectures thus suffer from various design and implementation tradeoffs.

Fast Fourier Transform (FFT) algorithms are valued for their ability reduce the complexity of Discrete Fourier Transform (DFT) calculations in computing frequency-domain representations of time-domain sequences (and vice versa). FFT algorithms produce identical results to "full" DFT calculations and simplify such calculations by breaking an initial DFT into multiple DFTs of reduced size. The DFT equation to compute a frequency-domain sequence representation $X[k]$, $k=0, 1, \ldots, N-1$, of a time-domain sequence $x[n]$, $n=0, 1, \ldots, N-1$, is defined as $$X[k] = \sum_{n=0}^{N-1} x[n] e^{-\frac{j2\pi kn}{N}} \quad (1)$$

$$k = 0, 1, \ldots, N-1.$$

Accordingly, full DFT calculations may require order $\mathcal{O}(N^2)$ operations, which FFT calculations may simplify to $\mathcal{O}(N \log_2 N)$ algorithms to provide a substantial reduction in computational complexity. FFT algorithms may perform this simplification by splitting the N-point DFT of Equation (1) into successively smaller DFT computations, and may rely on certain selections N, such as e.g. N as a power of two or product of prime numbers, in order to effectively factor an N-point DFT. While numerous different FFT algorithms exist, the Decimation in Frequency (DIF) FFT approach will be focused on herein.

The DIF FFT approach may split an input sequence $x[n]$ into halves and subsequently allow for computation of the "even" indices of output sequence $X[k]$ for $k=0, 2, 4, \ldots, N-2$ and for the "odd" indices of $X[k]$ for $k=1, 3, 5, \ldots, N-1$, thus warranting the "decimation" in frequency title. Assuming an even N, the DIF FFT approach may divide the indices $n=0, 1, \ldots, N-1$ of Equation (1) into "top" and "bottom" halves of $$n = 0, 1, \ldots, \frac{N}{2} - 1 \text{ and } n = \frac{N}{2}, \frac{N}{2} + 1, \ldots, N-1,$$

respectively, to yield $$X[k] = \sum_{n=0}^{\frac{N}{2}-1} x[n]W_N^{kn} + \sum_{n=\frac{N}{2}}^{N-1} x[n]W_N^{kn}, \quad (2)$$

where "twiddle factor" $W_N$ is defined as $$W_N = e^{-\frac{j2\pi}{N}}.$$

Equation (2) may then be re-written as $$X[k] = \sum_{n=0}^{\frac{N}{2}-1} x[n]W_N^{kn} + \sum_{n=0}^{\frac{N}{2}-1} x[n+N/2]W_N^{k(n+\frac{N}{2})}, \quad (3)$$

where subsequently factoring $W_N^{kN/2}$ from the right sum yields $$X[k] = \sum_{n=0}^{\frac{N}{2}-1} x[n]W_N^{kn} + W_N^{kN/2}\sum_{n=0}^{\frac{N}{2}-1} x[n+N/2]W_N^{kn}. \quad (4)$$

Noting that $W_N^{(N/2)k} = e^{2\pi k(N/2)/N} = e^{\pi k} = (-1)^k$ and factoring the common term $W_N^{nk}$, further simplification gives $$X[k] = \sum_{n=0}^{\frac{N}{2}-1} (x[n] + (-1)^k x[n+N/2])W_N^{nk}. \quad (5)$$

The even- and odd-indexed samples of X[k] for r=0, 1, ..., N/2−1 may then be separated as $$X[2r] = \sum_{n=0}^{\frac{N}{2}-1} (x[n] + x[n+N/2])W_{N/2}^{nr}, \quad (6a)$$
$$r = 0, 1, \ldots, N/2-1,$$

$$X[2r+1] = \sum_{n=0}^{\frac{N}{2}-1} (x[n] - x[n+N/2])W_N^n W_{N/2}^{nr}, \quad (6b)$$
$$r = 0, 1, \ldots, N/2-1,$$

The substitutions $x_e[n]=(x[n]+x[n+N/2])$, $x_o[n]=(x[n]-x[n+N/2])W_N^n$ thus yield $$X[2r] = \sum_{n=0}^{\frac{N}{2}-1} x_e[n]W_{N/2}^{nr}, \quad (7a)$$
$$r = 0, 1, \ldots, N/2-1,$$

$$X[2r+1] = \sum_{n=0}^{\frac{N}{2}-1} x_o[n]W_{N/2}^{nr}, \quad (7b)$$
$$r = 0, 1, \ldots, N/2-1,$$

Accordingly, the even-indexed outputs X[2r] and odd-indexed outputs X[2r+1] of X[k] may each be calculated as N/2-point DFT of $x_e[n]$ and $x_o[n]$, respectively. According to $x_e[n]$ and $x_o[n]$ as defined above, the input $x_e[n]$ to one N/2-point DFT is the sum of the first half of x[n] and the second half of x[n] while the input $x_o[n]$ to the other N/2-point DFT is the difference between the first half of x[n] and the second half of x[n] multiplied by a twiddle factor $$W_N^k = e^{-\frac{j2\pi k}{N}}.$$

DIF FFT may then further split each of the resulting N/2-point DFTs to yield two N/4-point DFTs based on the first and second halves of $x_e[n]$ and $x_o[n]$ in the same manner as the initial split. Depending on the size N, DIF FFT may continue to split each resulting reduced-size DFT to further factor the full N-point DFT into multiple reduced-size DFTs where the inputs to each reduced DFT undergo pre-processing to apply the combining and twiddle factor application of Equations (6a) and (6a).

Accordingly, an N-point DFT may be split into so-called "butterfly" computations for DIF FFT as depicted by radix-2 butterfly 100 of FIG. 1, where each radix-2 butterfly computation involves two complex additions (one addition and one subtraction amounting to a 2-point DFT due to the simplification of the complex exponential term to ±1) and a complex multiplication (by a twiddle factor $W_N^k$) between two given samples. Given N as a power of 2, an N-point DFT may be reduced into a butterfly network of $\log_2 N$ computation stages with each computation stage requiring N/2 butterflies, where application of DIFT FFT on a given input sequence x[n] yields an output sequence X[k] with outputs in "bit-reversed order" (i.e. the index order of each output is given by taking the logical inverse of the index position and converting this logical inverse to decimal to yield the correct index position within X[k]).

Figure 2:
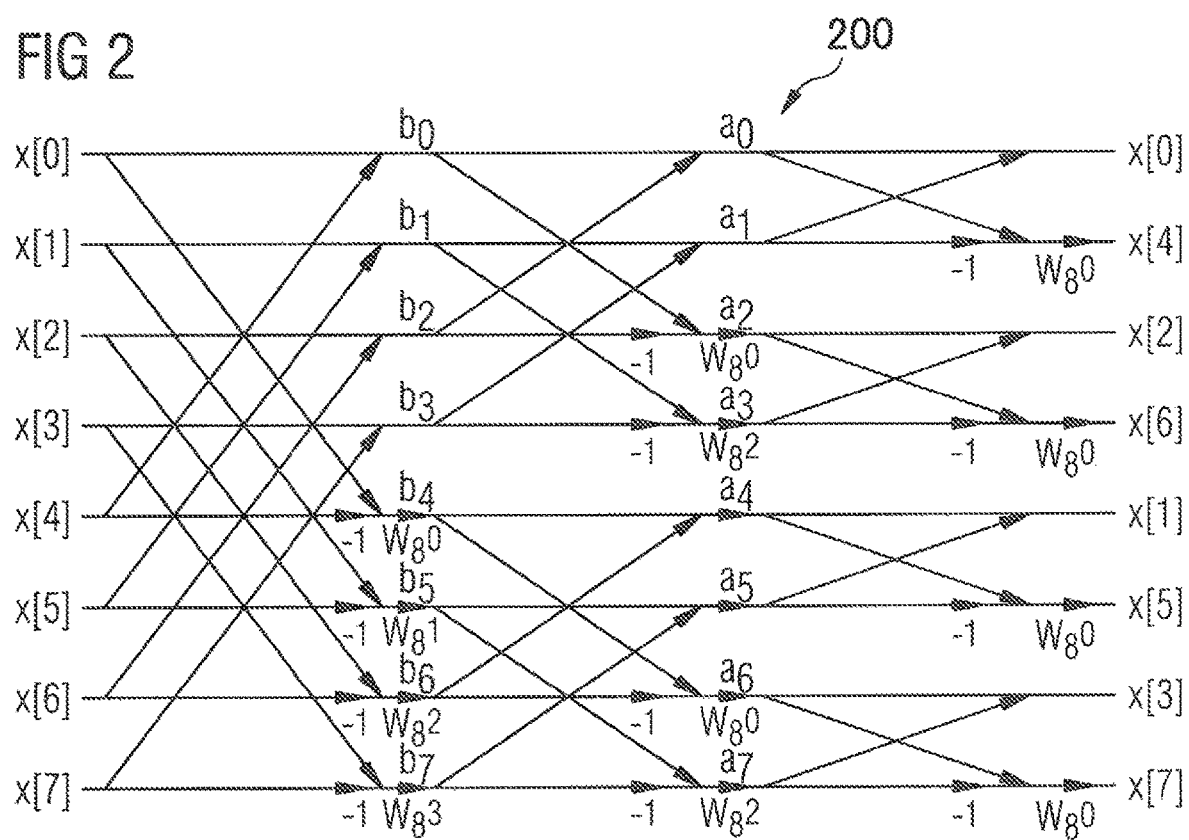
FIG. 2 shows a signal flow graph of a DIF FFT.

FIG. 2 shows signal flow graph 200 illustrating an N=8-point DIF FFT and the corresponding butterfly operations. As shown in FIG. 2, the 8-point FFT operation may be realized in $\log_2 8=3$ computation stages with 8/2=4 butterflies computations per stage, where the input sequence x[n], n=0, 1, ..., N−1 is provided in original order to the butterfly network to yield output sequence X[k], k=0, 1, ..., N−1 in bit-reversed order, i.e. where the i-th output sample (from top to bottom) corresponds to output sample having an index equal to the inverted binary representation of i converted back to decimal notation, e.g. the i=1 output sample corresponds to $X_4$ according to 1→001 (binary)→100 (inverted)→4 (decimal). The outputs of each intermediate computation stage are denoted as $b_n$ and $a_n$, which will be later referenced regarding FIGS. 3 and 4.

An FFT engine based on DIF may thus simplify a full DFT from $\mathcal{O}(N^2)$ operations to $\mathcal{O}(N \log_2 N)$ operations by dividing an N-point DFT (where N is a power of 2) into $\log_2 N$ stages of N/2 butterfly calculations. Various structural realizations of such a butterfly network have been proposed, such as in the aforementioned memory-based and pipelined FFT architectures. Memory-based architectures may be highly serialized, and may utilize a reduced number (e.g. as few as one) of butterfly compute elements and a memory to read inputs from the memory to perform a butterfly computation before writing the result back into the memory. A memory-based architecture may additionally utilize an input and an output memory bank configured in a ping-pong buffer architecture to allow for downloading subsequent input frames. However, while memory-based FFT engines may allow for effective area utilization (due to the reduced number of compute elements), such may need a dedicated RAM component in addition to complex control circuitry. Memory-based FFT architectures may thus suffer from both high leakage power dissipation (due to leaky SRAMs, in particular in scaled technologies) and high active power dissipation resulting from power-intensive read-write memory operations following each butterfly operation. While pipelined architectures may avoid memory leakage issues by employing a more parallelized architecture composed of multiple butterfly compute elements divided into pipeline stages, pipelined architectures may have substantial area cost and power requirements, in particular for large FFTs such as 2048-point.

Figure 3:
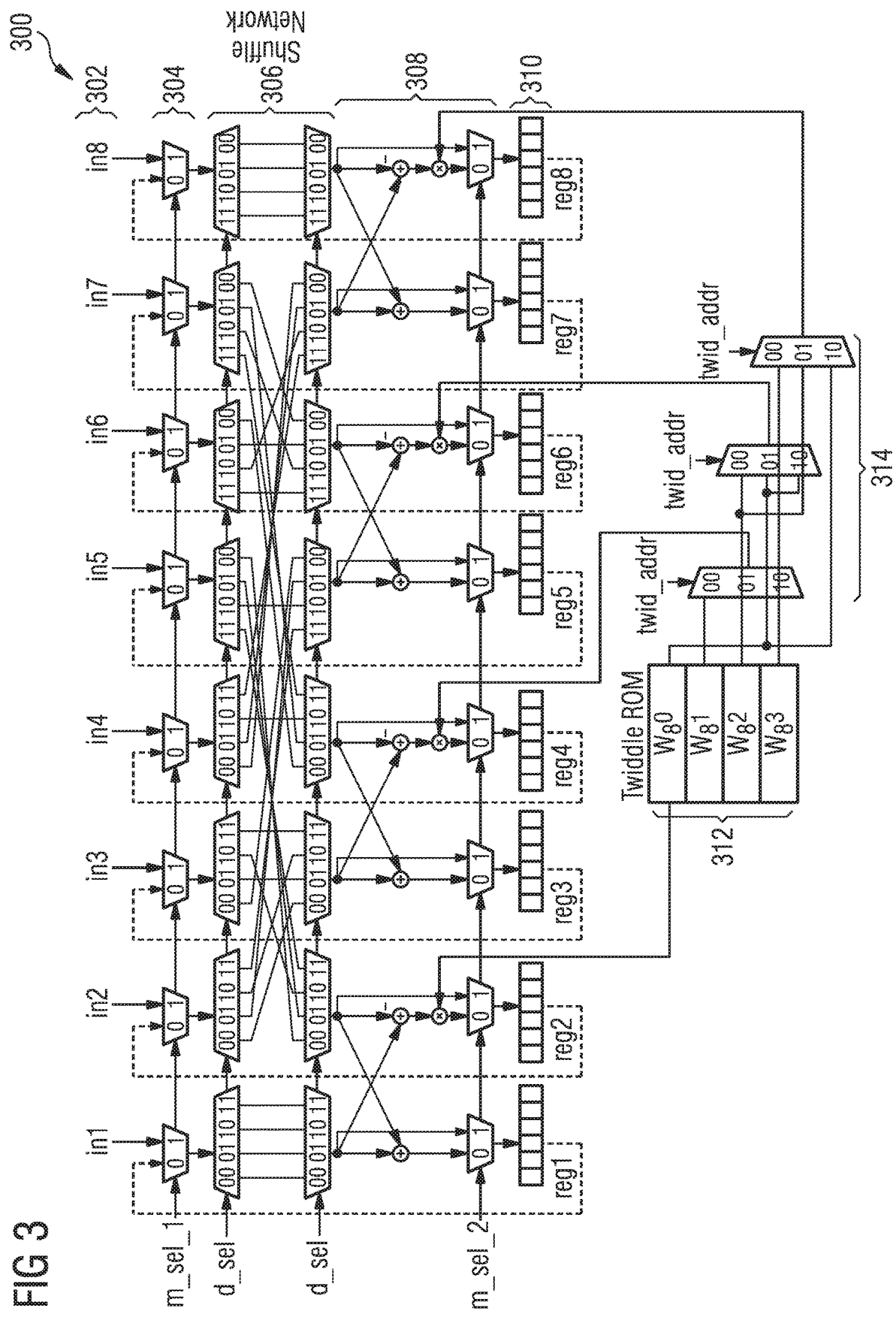
FIG. 3 shows an FFT computation circuit.

FIG. 3 shows FFT circuit 300, which may implement an FFT architecture based on DIF FFT. As will be detailed, FFT circuit 300 may include N/2 butterfly circuits, which FFT circuit 300 may operate in parallel and re-use to execute each FFT computation stage with relatively low-complexity control logic. Furthermore, FFT circuit 300 may be configurable, and accordingly may be capable of performing any M-point FFT where M≤N and both M and N are a power of 2 by deactivating butterflies (and additionally power-gating inactive butterflies to reduce power dissipation). As shown in FIG. 3, FFT circuit 300 may include input gates 302 ($in_1$, $in_2$, . . . , $in_N$), input multiplexers 304, shuffle network 306, butterfly network 308, intermediate/output registers 310 ($reg_1$, $reg_2$, . . . , $reg_N$), twiddle factor memory 312, and twiddle factor multiplexers 314.

For purposes of explanation and illustration, FFT circuit 300 is illustrated as an N=8-point FFT circuit; however, FFT circuit 300 may alternatively be realized to implement any FFT size by including more or less components according to N (i.e. N/2 butterfly circuits in butterfly network 308, N/2−1 twiddle factor multiplexers 314, one twiddle factor memory 312, N of the remaining components, and shuffle network 306 configured accordingly where N is a power of 2) and/or by activating and deactivating certain butterflies according to the configurability of FFT circuit 300 (to realize an M-point FFT where M≤N and M and N are each a power of 2).

FFT circuit 300 may process an input sequence x[n] under the control of control signals m_sel_1, d_sel, m_sel_2, and twd_add to obtain the DFT X[k] of the input sequence as an output sequence, where the output sequence may be re-ordered during the last clock cycle to re-arrange the bit-reversed output of DIF FFT algorithms to obtain an output sequence with correct order at intermediate/output registers 310. Although not explicitly shown in FIG. 3, FFT circuit 300 may additionally include a controller or control circuit configured to output values of m_sel_1, d_sel, m_sel_2, and twd_add according to the appropriate logic.

FIG. 4 shows signal chart 400 that specifies the values of control signals m_sel_1, m_sel_2, and d_sel in addition to the operations performed by butterfly network 308 and the values held at each of intermediate/output registers 310 for the exemplary N=8-point DFT realization illustrated for FFT circuit 300 in FIG. 3. Skilled persons will recognize the demonstrative nature of such an example and the scalability of FFT circuit 300 to all other compatible FFT sizes. As will be detailed, FFT circuit 300 may utilize m_sel_1 to read input sequence x[n] from input gates 302 during the first computation stage and from intermediate/output registers 310 during the remaining computation stages, m_sel_2 to implement a butterfly "bypass" operation to properly order the samples of output sequence X[k] in intermediate/output registers 310 during a final reordering stage, and d_sel to control the routing of initial, intermediate, and final results in shuffle network 306 to the correct butterfly circuits of butterfly network 308.

Accordingly, FFT circuit 300 may execute $log_2 N$ FFT computation stages to compute intermediate and final results for X[k] and a final reordering stage to re-order X[k] stored in intermediate/output registers 310 to have correct order (i.e. reversing the bit-reversed output order to obtain the original order). FFT circuit 300 may therefore operate over $log_2 N+1$ clock cycles in order to compute an length N output sequence X[k] as the DFT of a given length N input sequence x[n]. Each of the $log_2 N$ FFT computation stages may correspond to the $log_2 N$ FFT computation stages depicted in signal flow graph 200 for an N=8-point FFT.

FFT circuit 300 may first read the input sequence at clock cycle CLK=1, e.g. from an input buffer, at each of $in_1$-$in_N$ input gates 302. As shown in signal chart 400, m_sel_1 may be set to 1 in CLK=1, and accordingly input multiplexers 304 may select the input provided by input gates 302 during CLK=1. In the exemplary scenario, an N=8 length input sequence x[n] may be provided to FFT circuit 300, and accordingly FFT circuit 300 may receive x[0], x[1], . . . , x[N−1] at each of $in_1$-$in_N$ input gates 302, respectively. Input multiplexers 304 may thus provide input samples x[0], x[1], . . . , x[N−1] to shuffle network 306 during CLK=1 according to m_sel_1=1.

As depicted in FIG. 2, FFT circuit 300 may compute the intermediate results $b_0$-$b_{N-1}$ (denoted as "Operations" for CLK=1 in signal chart 400) in the first FFT computation stage using butterfly network 308 to process x[0]-x[N−1]. Accordingly, FFT circuit 300 may utilize control signal d_sel to control the input and output multiplexers of shuffle network 306 to route the inputs provided by input multiplexers 304 to the destination butterfly circuits of butterfly network 308. FFT circuit 300 may thus utilize the routing of shuffle network 306 for d_sel=00 to route the inputs provided by input multiplexers 304 to the correct butterfly circuits of butterfly network 308 to compute each of intermediate results $b_0$-$b_{N-1}$ from x[0]-x[N−1]. The input and output multiplexers of shuffle network 306 may accordingly act as routing control circuitry in order to route inputs provided by input multiplexers 304 via specific routing paths of shuffle network 306 according to the routing configuration specified by d_sel.

Figure 5:
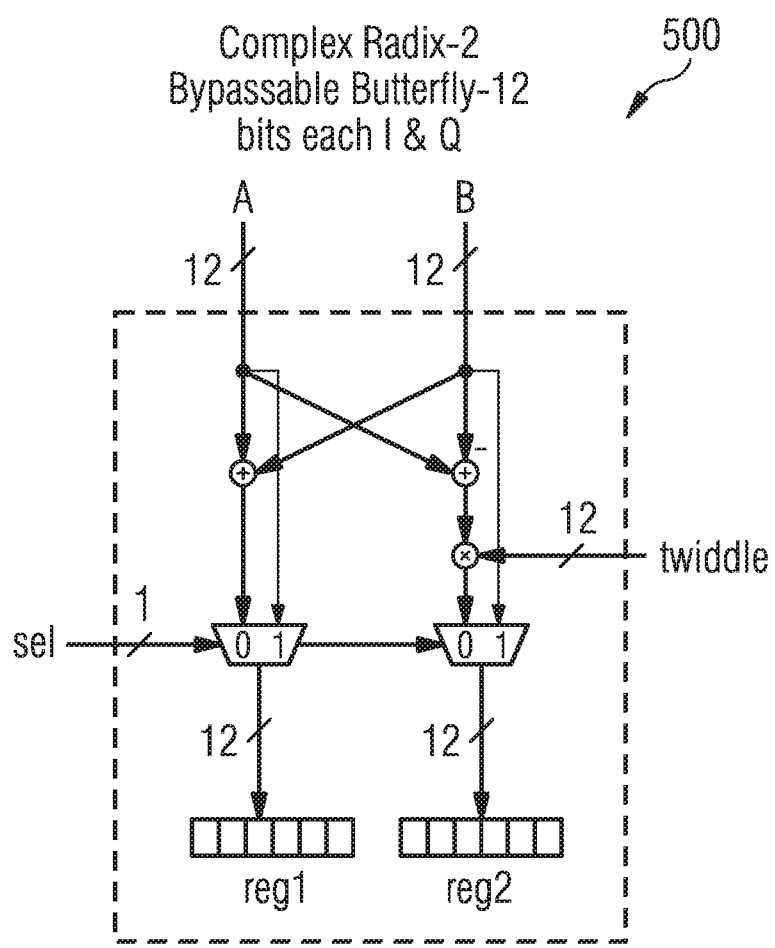
FIG. 5 shows a butterfly computation circuit.

Each butterfly circuit of butterfly network 308 may be configured to perform the complex addition and multiplication butterfly operation previously detailed regarding FIG. 1. FIG. 5 provides a diagram of butterfly circuit 500, which as depicted in FIG. 5 may be realized as a complex radix-2 bypassable butterfly with e.g. 12 bits each for in-phase (I) and quadrature (Q) components (although various other bit widths are recognized). As shown in FIG. 5, butterfly circuit 500 may include two complex adders and a multiplier (receiving a twiddle factor $W_N^k$ as input) to perform the butterfly operation on inputs A and B to produce outputs A+B and $(A-B)W_N^k$. As will be later detailed regarding the final reordering stage of FFT circuit 300, butterfly circuit 500 may additionally be "bypass-able", and accordingly may be include two output multiplexers to select either butterfly computation outputs A+B and (A−B)$W_N^k$ or butterfly inputs A and B as the actual output of butterfly circuit 500. Butterfly circuit 500 may provide the output (dependent on the output multiplexers) to two registers, which may be tightly bound to butterfly circuit 500 to hold the output of butterfly circuit 500. The bypassable operation of butterfly circuit 500 may be utilized by FFT circuit 300 to reorder the samples of output sequence X[k] to have the correct order from k=0, 1, . . . , N−1 as opposed to the bit-reversed order conventionally output by DIF FFT engines.

Accordingly, the butterfly circuits of butterfly network 308 may be configured as shown in FIG. 5, and thus may be tightly bound to intermediate/output registers 310 to provide the output of each butterfly circuit after each FFT computation stage and the final reordering stage to intermediate/output registers 310.

Butterfly network 308 may thus process the samples of input sequence x[n] provided by shuffle network 306 (according to d_sel=00) during CLK=1, where m_sel_2 is set to 0 in order to control each butterfly circuit of butterfly network 308 to provide intermediate results $b_0$-$b_{N-1}$ (as defined in signal chart 400) to intermediate output/registers 310 (thus not employing the bypass mechanism of butterfly network 308). As shown in FIG. 3, each butterfly circuit may apply a twiddle factor $W_N^k$ from twiddle memory 312 as selected by twiddle factor multiplexers 314 according to twid_addr. FFT circuit 300 may thus employ twiddle factor memory 312 as a lookup table (e.g. implemented as ROM memory) in order to avoid unnecessary repeated calculations of twiddle factors $W_N^k$ (of which only $W_8^0$, $W_8^1$, $W_8^2$, and $W_8^3$ are required for an N=8-point FFT). As $W_N^0$ is consistently routed to the first butterfly circuit of butterfly network 308 during each clock cycle, only FFT circuit 300 may need only N/2−1 twiddle factor multiplexers 314 for providing the butterfly circuits of butterfly network 308 with the respective twiddle factors $W_N^k$ during each clock cycle.

The butterfly circuits of butterfly network 308 may thus perform the respective butterfly operations and provide the results to intermediate/output registers 310 $reg_1$-$reg_{N-1}$, which may thus respectively hold $b_0$-$b_{N-1}$ as shown in signal chart 400 at the end of CLK=1.

FFT circuit 300 may then begin CLK=2, in which input registers 304 select (m_sel_1=0) the input provided by intermediate/output registers 310 to provide to shuffle network 306, and accordingly may provide intermediate results $b_0$-$b_{N-1}$ to shuffle network 306. It is noted that the exemplary N=8 configuration of FFT circuit 300 depicted in FIG. 3 and detailed herein is exemplary, and accordingly the following procedure may be adjusted according to N to analogously implement FFT circuit 300 for any compatible N.

Shuffle network 306 may then route the inputs from input registers 304 according to d_sel ($d_{sel}$=01, e.g. according to a 2-bit mod $log_2$ N counter which may be similarly adapted for other selections for N) to the respective butterfly circuits of butterfly network 308, which may again perform the respective butterfly computations according to the received inputs and twiddle factors $W_N^k$ to provide intermediate results ($a_0$-$a_7$ for the exemplary N=8-point realization) to intermediate/output registers 310, where m_sel_2 again is set to m_sel_2=0 (and likewise for all FFT computation stages).

FFT circuit 300 may thus continue to re-use butterfly network 308 over each of the $log_2$ N FFT computation stages according to the inputs (intermediate results stored in intermediate/output registers 310) provided by shuffle network 306 and twiddle factor $W_N^k$ provided by twitter factor multiplexers 314 for each of the $log_2$ N FFT computation stages. Upon completing the $log_2$ N-th FFT computation stage (CLK=3 for N=8), FFT circuit 300 may thus hold output sequence X[k] in intermediate/output registers 310. However, as previously indicated output sequence X[k] may be in bit-reversed order. Accordingly, FFT circuit 300 may implement a final reordering stage (CLK=4 for N=8; CLK=$log_2$ N+1 for general N) with m_sel_2=1 and $d_{sel}$=11 selected to route the output sequence samples provided by input registers 304 to the correct position within intermediate/output registers 310 (d_sel=1 in the exemplary N=8 configuration shown in FIG. 3). As m_sel_2 is set to 1, FFT circuit 300 may activate the bypass mechanism of the butterfly circuits of butterfly network 308, and accordingly may skip the complex addition and multiplication processing of each butterfly circuit in order to re-order the samples of output sequence X[k] to the correct position within intermediate/output registers 310 $reg_1$-$reg_N$, e.g. such that X[0], X[1], . . . , X[N−1] are respectively held by output registers 310 $reg_1$, $reg_2$, . . . , $reg_N$.

Accordingly, FFT circuit 300 may re-use N/2 butterfly circuits in parallel as butterfly network 308 in coordination with shuffle network 306 in order to effectively route initial, intermediate, and output results to the respective butterfly circuits of butterfly network 308 with relatively simply control logic in order to realize an N-point DFT (with N being a power of 2). As FFT circuit 300 employs registers (intermediate/output registers 310 tightly bound to the butterfly circuits of butterfly network 308) to hold intermediate results, FFT circuit 300 may be realized as a largely "memoryless" (with the exception of twiddle factor memory 312) architecture, and accordingly may avoid the memory leakage issues of conventional memory-based FFT architectures (in particularly those employing RAM). Additionally, through re-use of butterfly network 308 over the FFT computation stages FFT circuit 300 may obtain appreciably higher area utilization than conventional pipelined approaches.

Figure 6:
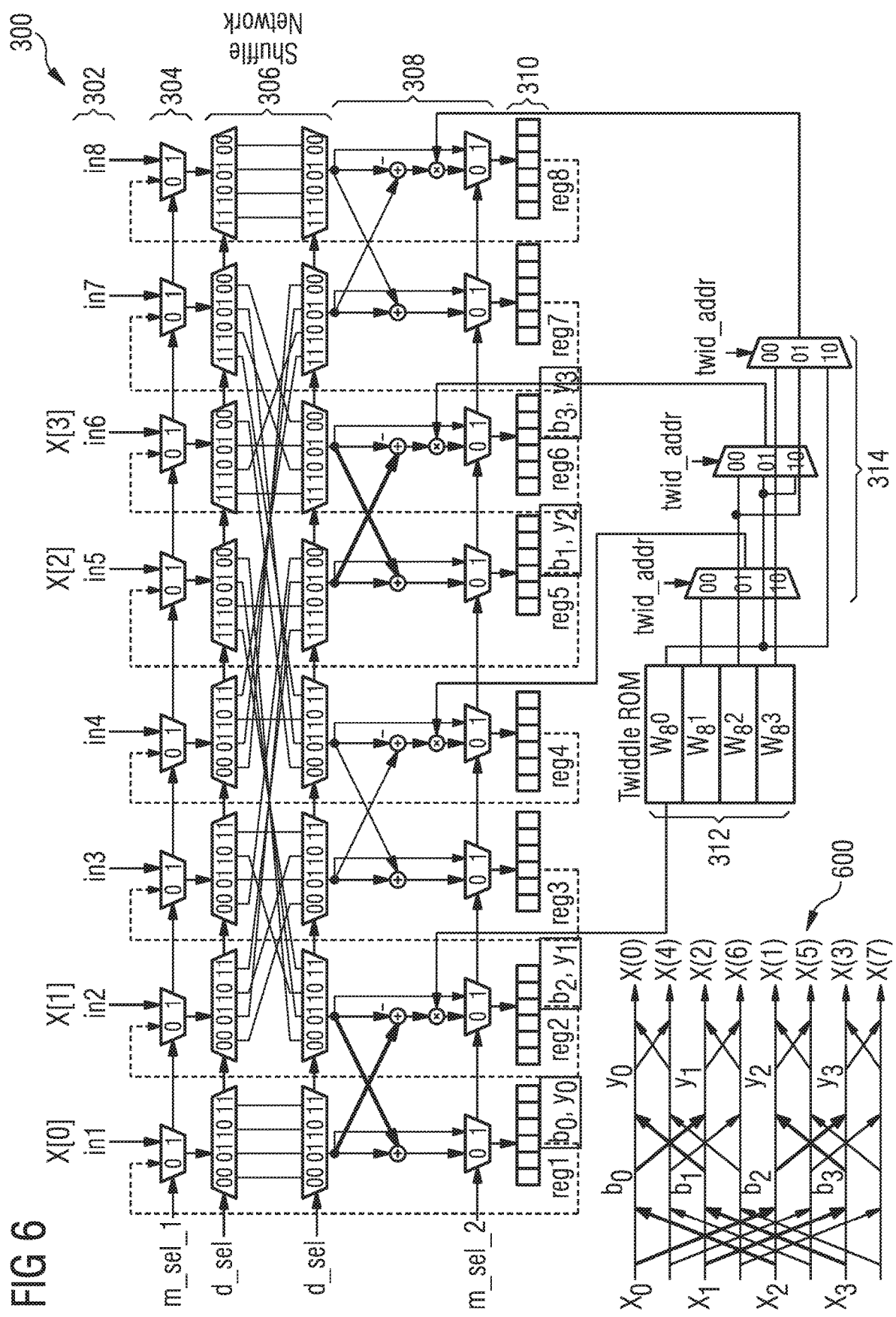
FIG. 6 shows a configurable mechanism of the FFT computation circuit of FIG. 3.

As previously indicated, FFT circuit 300 may additionally be configurable, and accordingly may be easily reconfigured to implement an M-point DFT for M≤N for M, N as powers of 2. FIG. 6 shows an example in which FFT circuit 300 realized as an N=8-point FFT may be reconfigured to implement an M=4-point FFT. As shown in FIG. 6, input gates 302 $in_1$, $in_2$, $in_5$, and $in_6$ may receive N=4-length input sequence x[n] for clock cycle CLK=1 and utilize only two of the butterfly circuits of butterfly network 308 (as only M/2=2 butterfly circuits are needed) for the $log_2$ M=2 FFT computation stages. As depicted by in signal flow chart 600, FFT circuit 300 may calculate intermediate results $b_0$-$b_3$ with butterfly network 308 (as dictated by d_sel and shuffle network 306) which may be stored in intermediate/output registers 310 as shown in FIG. 6. FFT circuit 300 may then reuse the same M/2 butterfly circuits of butterfly network 308 for the CLK=2 to calculate final results $y_0$-$y_3$. FFT circuit 300 may then apply a final reordering stage in CLK=3 to route $y_0$-$y_3$ to the correct position within intermediate/output registers 310. The remaining butterfly circuits of butterfly network 308 not employed for the M-point FFT may be power gated to reduce power dissipation.

While FFT circuit 300 may have greater area requirements than conventional memory-based architectures, FFT circuit 300 may provide a dramatic reduction in energy usage due to the reduced number of clock cycles (which may be as high as a factor of N/2 over memory-based architectures employing only a single butterfly compute element). However, the relatively long interconnects of shuffle network 306 and from intermediate/output registers 310 to input multiplexers 304 may result in high power dissipation directly resulting from the long traversal of data along the interconnects. Accordingly, the switching activity on the interconnects may have a high power penalty, such as e.g. 10 ns switches on shuffle network interconnects and 1 ns switches (both with 1 ns pulse duration) on the register-input multiplexer interconnects.

Figure 7:
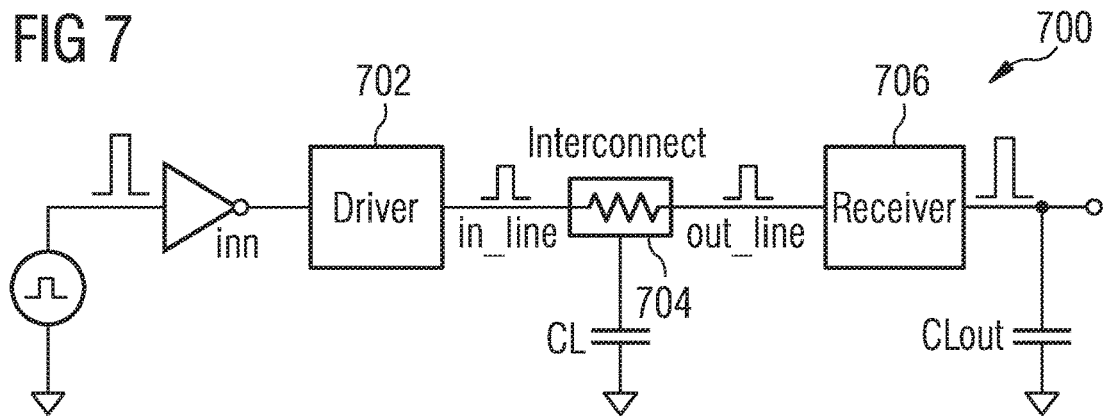
FIG. 7 shows a interconnect structure of the FFT computation circuit of FIG. 3.

FIG. 7 shows a high level schematic 700 of the interconnect architecture, which may be employed in some or all of the interconnects of FFT circuit 300 (including both shuffle network interconnects between the input multiplexers and output multiplexers of shuffle network 306 and the register-input multiplexer interconnects between intermediate/output registers 310 and input multiplexer 304). In order to reduce power dissipation, driver 702 may convert a full-swing input to a reduced-swing interconnect signal for traversal across interconnect 704 (modeled in FIG. 7 as a resistor-capacitor (RC) network). Receiver 706 (located at the opposite end of the interconnect from the driver) may then convert the reduced-swing interconnect signal back to a full-swing output, where interconnect 704 is assumed to be a metal-5 layer wire with e.g. a 100 μm length. Driver 702 and receiver 706 may utilize a single-supply-based level shifting scheme to minimize routing overhead.

Figure 8A:
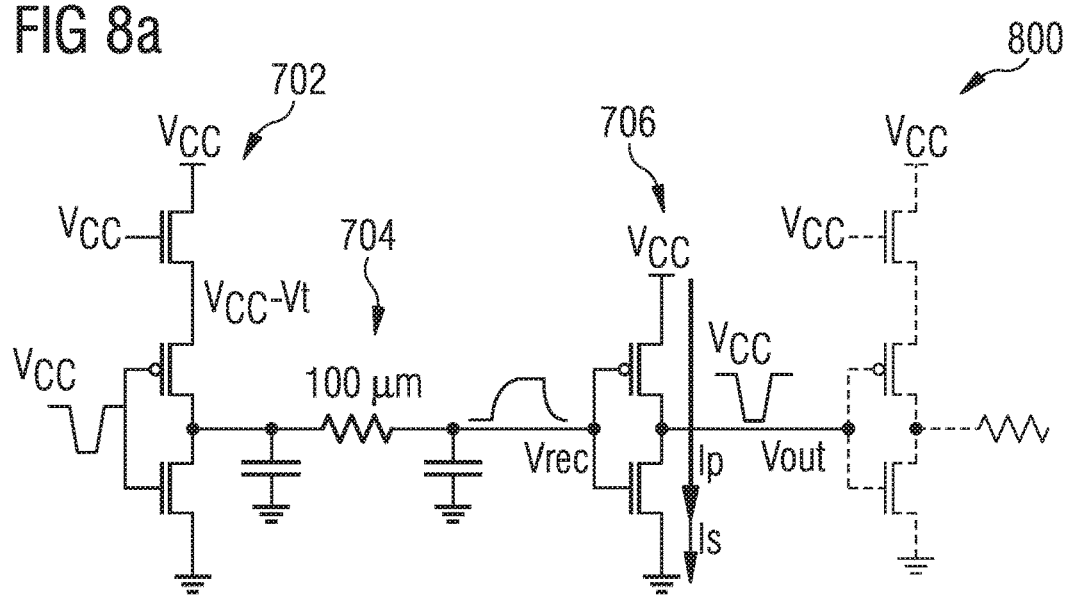
FIGS. 8a and 8b show a first interconnect circuitry and a second interconnect circuitry.
Figure 8B:
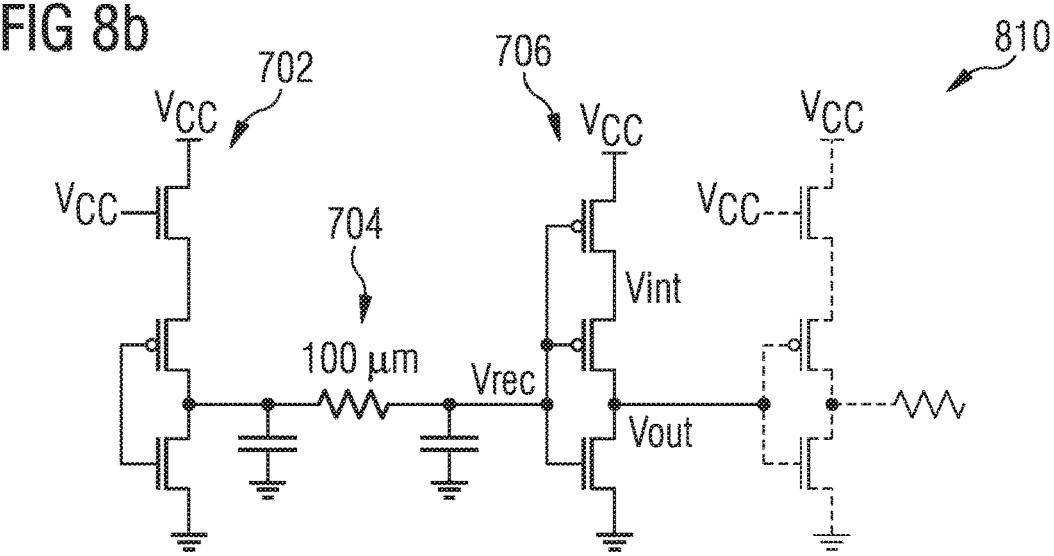

FIGS. 8a and 8b show inverter chain realization 800 and stacked inverter chain realization 810, respectively, of driver 702, interconnect 704, and receiver 706. As shown in FIGS. 8a and 8b, driver 702 and receiver 706 may be composed of NMOS and PMOS transistors while interconnect 704 may be modeled as an RC network.

Inverter chain realization 800 may offer a straightforward implementation for driver 702, interconnect 704, and receiver 706 that offers both low-area and high speed. However, the voltage swing across interconnect 704 may be from 0 to $V_{cc}$-$V_t$ according to the transistor threshold voltage $V_t$, and accordingly the voltage $V_{rec}$ at the receiving node of receiver 706 may not go to "full swing" $V_c$. As a result, the upper PMOS of receiver 706 may not be completely shut off, and thus may induce a leakage current $I_s$ through receiver 706. Accordingly, inverter chain realization 800 may suffer from significant static leakage and high switching power consumption.

Stacked inverter realization 810 depicted in FIG. 8b may offer the same low-area and high-speed advantages of inverter chain realization 800. As shown in FIG. 8b, stacked inverter realization 810 may include a PMOS as a stacked device in receiver 706 (between the original PMOS and NMOS of receiver 706 of inverter chain realization 800). The presence of this stacked PMOS device may thus reduce the leakage current through receiver 706 compared to stacked inverter chain realization 810, which may provide leakage reductions of up to e.g. 30% and reduce the switching power consumption by e.g. 25%. Despite such reductions, stacked inverter realization may nevertheless leak substantially more than a conventional inverter with a full swing at its input.

Figure 9:
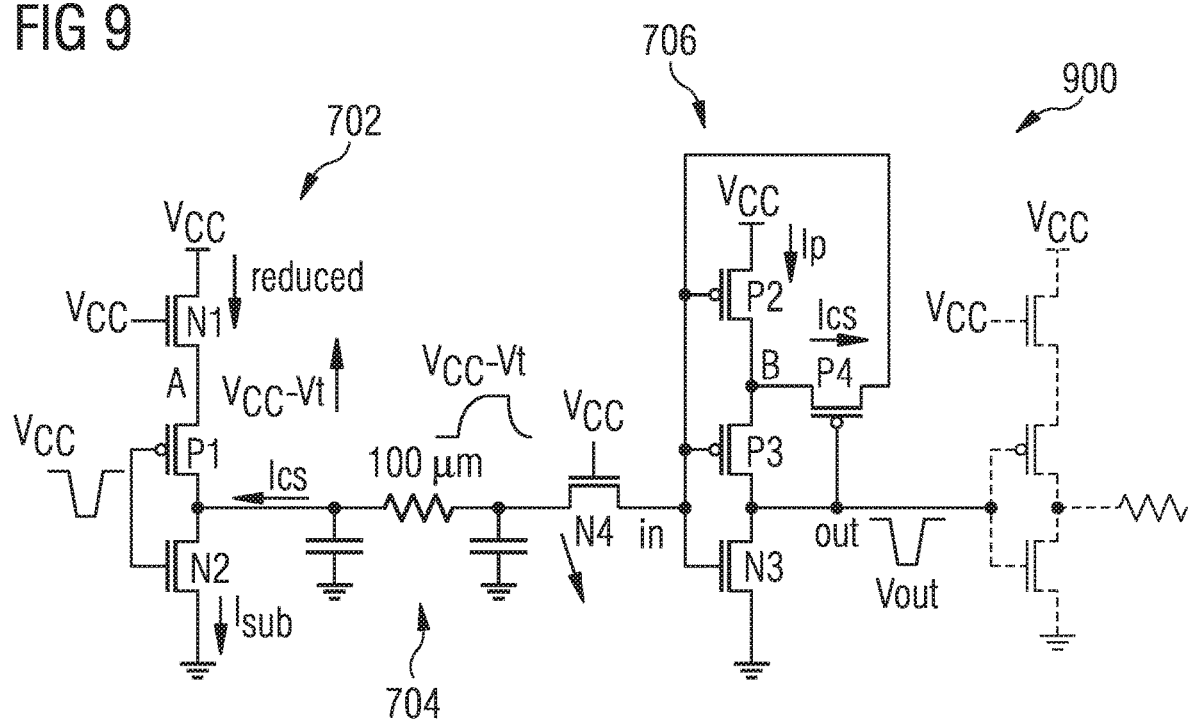
FIG. 9 shows a third interconnect circuitry.

FIG. 9 shows current-steering (CS) level-shifter realization 900 of driver 702, interconnect 704, and receiver 706, which may provide single-ended reduced voltage swing while further reducing static leakage through receiver 706. As shown in FIG. 9, CS level-shifter realization 900 may additionally include PMOS $P_4$ and NMOS $N_4$ in addition to stacked PMOS $P_3$ (similar to stacked inverter realization 910) in receiver 706.

As shown in FIG. 9, CS level-shifter realization 900 may include $P_4$ as a feedback device connected at the gate terminal to output node out while the other terminals are connected to node B and the input node in of receiver 706. Accordingly, as in rises to $V_{cc}$-$V_t$, pull-down NMOS $N_3$ turns on and pulls out to 0, which subsequently turns on feedback PMOS $P_4$ to provide a low-resistance path to the short circuit current from $V_{cc}$ at receiver 706 (as introduced regarding stacked inverter chain realization 810). The resulting current steering thus assists in charging the parasitic capacitance of interconnect 704. However, the same current steering deteriorates the high swing of in to above $V_{cc}$-$V_t$ towards full swing $V_{cc}$, which would accordingly eliminate the power-saving benefits of reduced-swing over interconnect 704. In order to counter this and as a result limit the swing on interconnect 706 to $V_{cc}$-$V_t$, CS level-shifter realization 900 additionally includes clipper NMOS $N_4$ between interconnect 704 and receiver 706 to allow in to rise to full $V_{cc}$ while constraining the output node of driver 702 (on the opposite side of interconnect 704) to $V_{cc}$-$V_t$ (thus preserving the reduced swing over interconnect 704). Accordingly, inclusion of $P_4$, $P_3$, and $N_4$ in CS level-shifter realization 900 may provide reduced swing over interconnect 704 while simultaneously recycling the current through receiver 706 that would otherwise be wasted into ground. Clipper PMOS $P_4$ may be selected to be minimum-sized to prevent from contending with pulldown NMOS $N_3$ during the 0→$V_{cc}$ transition at the input of driver 702.

In steady state, $P_2$ sees a non-zero $V_{GS}$ and thus draws a substantial leakage current from the supply. However, since $P_4$ is on, $P_3$ sees a $V_{GS}$=0, and accordingly receiver 706 divers the excessive leakage current by $P_4$ back towards driver 702 where the leakage current is drained to ground by the subthreshold leakage of $N_2$. As a result, CS level-shifter realization 900 obtains both reduced-swing over interconnect 704 while minimizing leakage current through receiver 706.

Figure 10A:
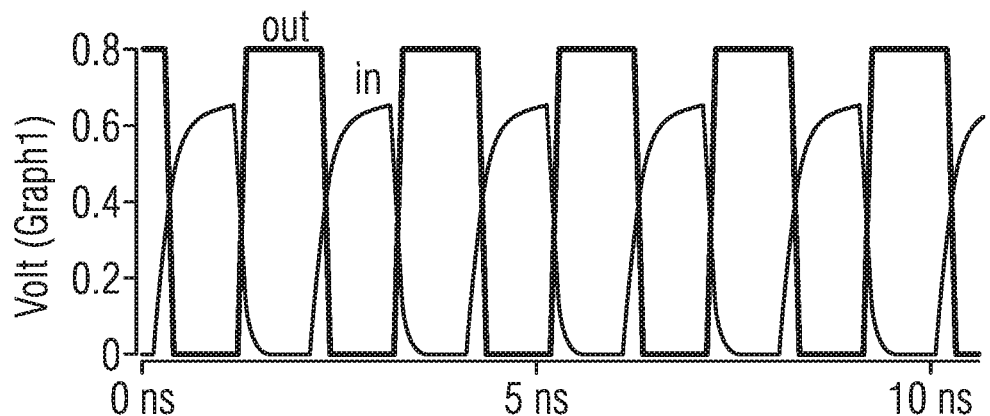
FIGS. 10a-10c show voltage and current plots of the third interconnect circuitry of FIG. 9.
Figure 10B:
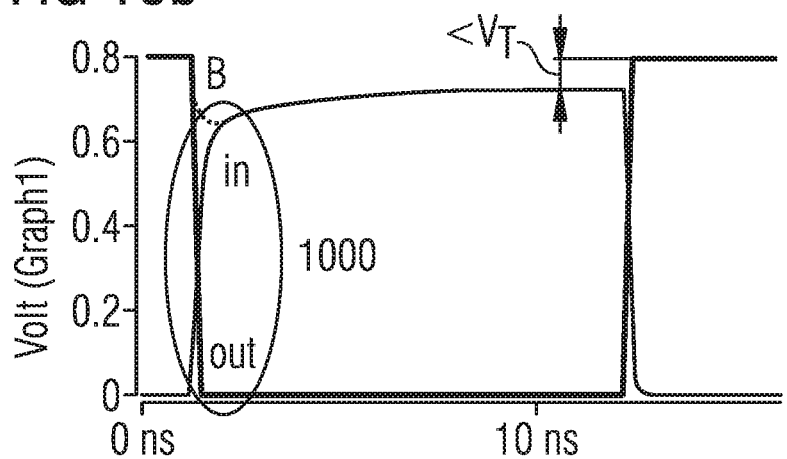
Figure 10C:
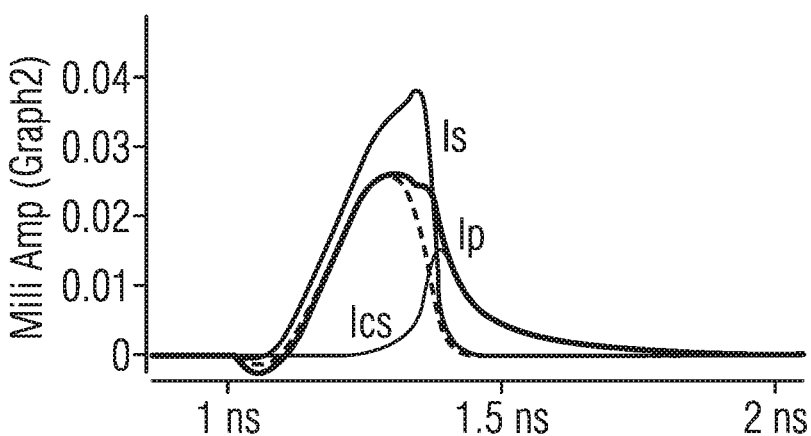

FIGS. 10a-10c show voltage and current plots for CS level-shifter realization 900. FIG. 10a depicts the voltage for input node in and output node out of receiver 706 during high-switching activity, and thus illustrates the single-ended swing reduction to $V_{cc}$-$V_t$ over interconnect 704. FIG. 10b depicts the voltage for input node in, output node out, and node B of receiver 706 during low-switching activity, where FIG. 10c plots the currents $I_s$, $I_p$, and $I_{cs}$ during high-to-low transitions of output node out specified at 1000 of FIG. 10b.

While CS level-shifter realization 900 may succeed in preserving the low-area and high-speed benefits of inverter chain realization 800 and stacked inverter chain realization 810 with the added benefits of reduced swing and low leakage power, CS level-shifter realization 900 may nevertheless only provide "single-ended" voltage swing reduction, i.e. from $V_{cc}$ to $V_{cc}$-t on the upper side of the voltage swing across interconnect 704 while still falling completely to ground on the lower side.

Figure 11:
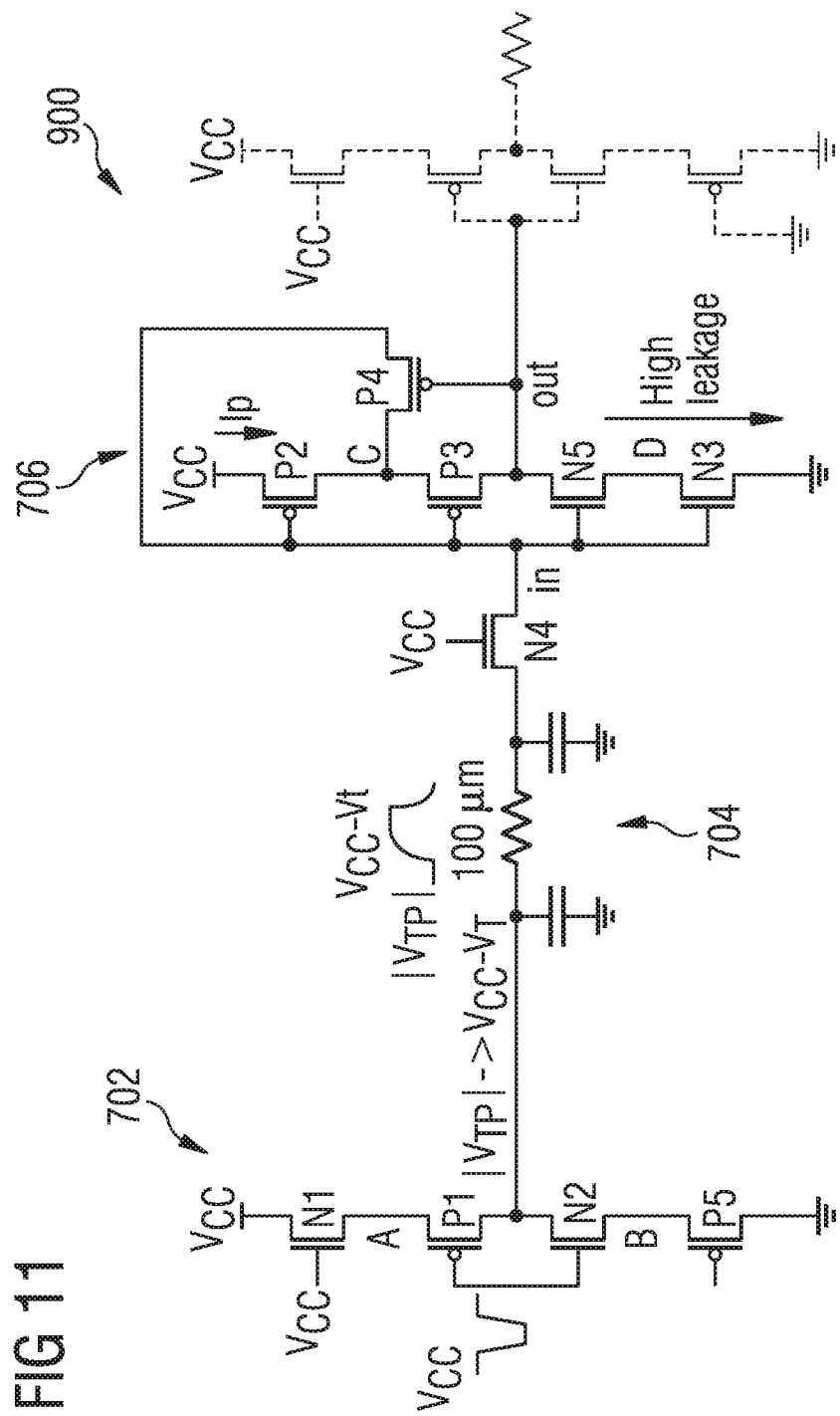
FIG. 11 shows a fourth interconnect circuitry.

FIG. 11 shows CS level-shifter realization 1100, which offers dual-ended reduced voltage swing compared to the single-ended voltage-swing reduction of CS level-shifter realization 900. As shown in FIG. 11, CS level-shifter realization 1100 may include PMOS $P_5$ and NMOS $N_5$ in addition to clipper NMOS $N_4$, current-steering PMOS $P_4$, and stacked PMOS $P_3$.

The inclusion of clipper $P_5$ may allow CS level-shifter realization 1100 to obtain a voltage swing reduction on the N-side, thus allowing allow FFT circuit 300 to further obtain a dual-ended voltage-swing reduction across interconnect 704. As shown in FIG. 11, clipper $P_5$ may be placed in the NMOS pull-down branch of driver 702 with its gate connected to ground. Accordingly, the output node of driver 702 may not be allowed to perform a complete swing to ground and accordingly may be constrained to $|V_{tp}|$. As the output node of driver 702 is limited to $|V_{tp}|$ on the lower end of the voltage swing, the interconnect voltage swing may as a result be from $|V_{tp}|$ to $V_{cc}$-$V_t$.

The low-to-high voltage transitions over interconnect 704 may function in the same manner as CS level-shifter realization 900, where in at receiver 706 falls from $V_{cc}$-$V_t$ to $|V_{tp}|$ and subsequently prompts PMOS transistors $P_2$ and $P_3$ to turn on and pull out towards $V_{cc}$. NMOS $N_5$ is additionally included in a stacked configuration to reduce the leakage arising from the $V_{GS}$ of $|V_{tp}|$ across $N_3$.

Figure 12A:
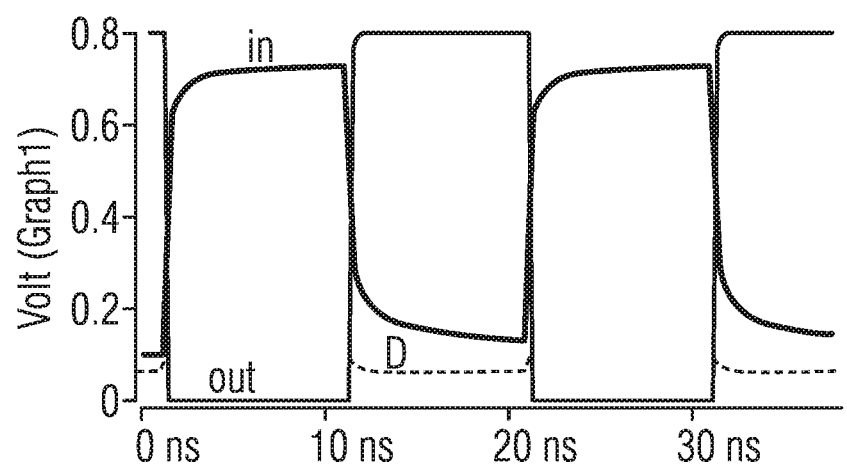
FIGS. 12a-12b show voltage plots of the fourth interconnect circuitry of FIG. 11.
Figure 12B:
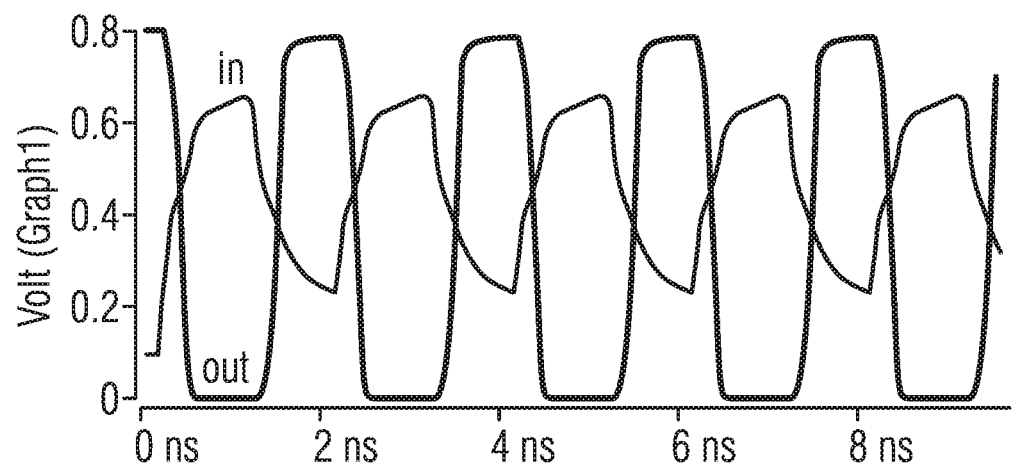

FIGS. 12a and 12b depict the voltage curves for low-switching activity and high-switching activity, respectively, of CS level-shifter realization 1100 at nodes in, out, and D (FIG. 12a only). As shown in FIGS. 12a and 12b, CS level-shifter realization 1100 may obtain dual-ended voltage-swing reductions at in (and thus over interconnect 704) between $V_{cc}$-$V_t$ and $|V_{tp}|$ while maintaining a full voltage-swing between $V_{cc}$ and ground at out. While CS level-shifter realization 1100 may result in a higher leakage (in addition to area requirements and delay) due to $N_5$ and $N_3$ than CS level-shifter realization 900, the reduced voltage-swing at each transition over interconnect 704 may render CS level-shifter realization 1100 more suitable for high-switching activity such as the rapid interconnect switching of FFT circuit 300.

While CS level-shifter realization 900 and CS level-shifter realization 1100 include a single clipper NMOS $N_4$ between interconnect 704 and in of receiver 706, CS level-shifter realization 900 and CS level-shifter realization 1100 may include one or more additional clipper NMOS transistors connected in series with $N_4$ in order to further reduce the amount of current that is steered back towards driver 702, where any number of additional "stacked" clippers may be connected in series with $N_4$ in order to increase the benefit. It is thus noted that CS level-shifter realization 900 and CS level-shifter realization 1100 are not limited to a single clipper NMOS.

FFT circuit 300 may thus implement any of inverter chain realization 800, stacked inverter chain realization 810, CS level-shifter realization 900, CS level-shifter realization 1100, or any combination thereof for the shuffle network interconnects of shuffle network 306 and the register-input multiplexer interconnects between intermediate/output registers 310 and input multiplexer 304, and accordingly may effectively counter the potentially high power dissipation of long interconnects. FFT circuit 300 may thus provide a low-area and low-latency FFT engine employing parallelized butterfly compute elements and a shuffle network with low-swing interconnects.

Figure 13:
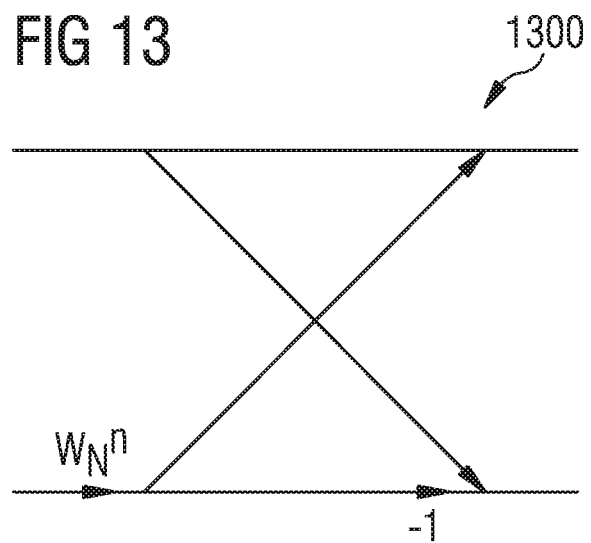
FIG. 13 shows a diagram of a Decimation in Time (DIT) FFT butterfly computation.

FFT circuit 300 may be based on a DIF FFT approach and accordingly employ shuffle network 306 to route initial, intermediate, and output results to specific radix-2 DIF butterflies of butterfly network 306. FFT circuit 300 may alternatively be implemented according to a DIT FFT approach. Accordingly, shuffle network 306 may be re-arranged according to the signal flow graph of a DIT FFT (with a bit-reversed input order as opposed to the bit-reversed output order of DIF FFT, which may be similarly implemented in with an initial or final re-ordering stage or through prior arrangement of input gates 302) and butterfly network 308 may be replaced with a butterfly network containing radix-2 DIT butterfly circuits as shown in FIG. 13 as butterfly circuit 1300.

FFT circuit 300 may additionally be implemented in a "hybrid" architecture, such as combined with a memory-based architecture. For example, FFT circuit 300 realized with N=64 and combined with a conventional memory-based architecture (composed of one or more butterfly compute elements) in order for up to a 64 point DFT to be calculated in parallel by FFT circuit 300 while the memory-based architecture may calculate the remaining points of a larger DFT.

Furthermore, while FFT circuit 300 has been detailed above as utilizing radix-2 butterfly circuits, FFT circuit 300 may be reconfigured to utilize e.g. radix-3 butterfly circuits, radix-4 butterfly circuits, etc., and is accordingly not limited to any specific radix.

Figure 14:
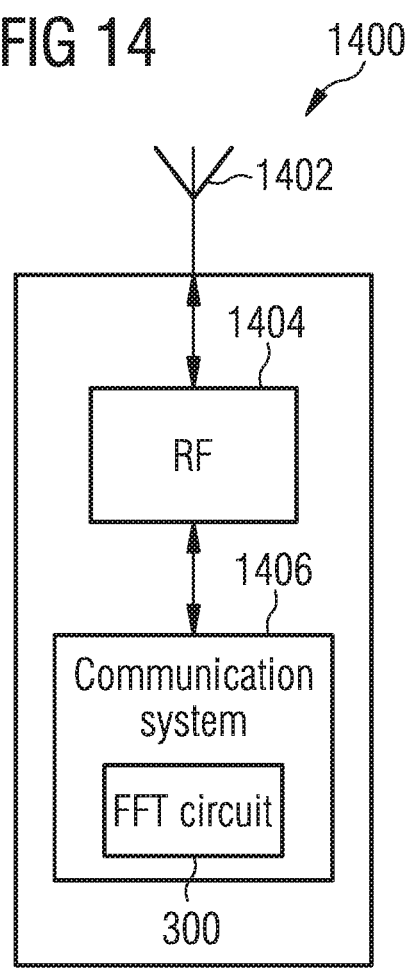
FIG. 14 shows a mobile communication device.

FFT circuit 300 may be employed in any application requiring an FFT engine, which may include communication systems such as the aforementioned wireless communication systems that utilize OFDM. For example, FFT circuit 300 may be included as a component of wireless communication device 1400 shown in FIG. 14, which may include antenna system 1402, RF transceiver 1404, and communication system 1406. As shown in FIG. 14, FFT circuit 300 may be included in communication system 1406, which may be a baseband modem, baseband chip, or other similar communication control system. Communication system 1406 may employ FFT circuit 300 (e.g. as part of physical layer circuitry) to perform FFT calculations and/or Inverse FFT (IFFT) calculations, such as an FFT calculation for received downlink OFDM signals as part of a demodulation process (e.g. at a mobile terminal) or an IFFT calculation for uplink OFDM signals as part of a modulation process (e.g. at a base station).

While wireless communication systems have been specifically addressed, FFT circuit 300 may be employed in numerous different signal processing, circuit analysis, control system, imaging (such as e.g. medical for Magnetic Resonance Imaging (MRI), Electroencephalography (EEG), Electrocardiography (ECG), Electronystagmography (ENG), Electrooculography (EOG), Electromyography (EMG), etc.), radar, speech processing, etc.

FIG. 15 shows method 1500 for calculating a transform of an input sequence. As shown in FIG. 15, method 1500 includes performing a plurality of butterfly computations at a plurality of butterfly computation circuits to produce a plurality of outputs during each of a plurality of computation stages (1510), routing a first plurality of outputs of the plurality of butterfly computation circuits from a first computation stage of the plurality of computation stages as input to the plurality of butterfly computation circuits during a second computation stage of the plurality of computation stages according to a reconfigurable routing configuration (1520), and modifying the reconfigurable routing configuration for a third computation stage of the plurality of computation stages (1530).

In one or more further exemplary aspects of the disclosure, one or more of the features described above in reference to FIGS. 1-14 may be further incorporated into method 1500. In particular, method 1500 may be configured to perform further and/or alternate processes as detailed regarding FFT circuit 300.

FIG. 16 shows method 1600 for calculating a transform of an input sequence. As shown in FIG. 16, method 1600 includes performing a butterfly computation at each of a plurality of butterfly computation circuits on a respective plurality of inputs to produce a plurality of outputs during each of a plurality of computation stages (1610), routing the plurality of outputs from each antecedent computation stage of the plurality of computation stages via a wired routing network as inputs to the plurality of butterfly computation circuits in each subsequent computation stage of the plurality of computation stages according to a reconfigurable routing configuration (1620), and adjusting the reconfigurable routing configuration during the plurality of computation stages according to the transform (1630).

In one or more further exemplary aspects of the disclosure, one or more of the features described above in reference to FIGS. 1-14 may be further incorporated into method 1600. In particular, method 1600 may be configured to perform further and/or alternate processes as detailed regarding FFT circuit 300.

It is appreciated that the terms "user equipment", "UE", "mobile terminal", etc., may apply to any wireless communication device, including cellular phones, tablets, laptops, personal computers, wearables, multimedia playback devices, consumer/home appliances, vehicles, etc., and any number of additional electronic devices capable of wireless communications.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

The following examples pertain to further aspects of the disclosure:

Example 1 is a calculation circuit for calculating a transform of an input sequence, the calculation circuit including a plurality of butterfly computation circuits each configured to perform a butterfly computation on a respective plurality of inputs and to produce a respective output during each of a plurality of computation stages, a wired routing network configured to route the outputs of the plurality of butterfly computation circuits from each antecedent computation stage of the plurality of computation stages as inputs to the plurality of butterfly computation circuits in each subsequent computation stage of the plurality of computation stages according to a reconfigurable routing configuration, and routing control circuitry configured to change the reconfigurable routing configuration during the plurality of computation stages according to the transform.

In Example 2, the subject matter of Example 1 can optionally include wherein the routing control circuitry is configured to change the reconfigurable routing configuration for each of the plurality of computation stages.

In Example 3, the subject matter of Example 1 or 2 can optionally include wherein the plurality of butterfly computation circuits are further configured to output the transform of the input sequence following the final computation stage of the plurality of computation stages.

In Example 4, the subject matter of any one of Examples 1 to 3 can optionally include wherein the routing control circuitry is configured to change the reconfigurable routing configuration during the plurality of computation stages to calculate the transform of the input sequence as a Fast Fourier Transform (FFT) of the input sequence.

In Example 5, the subject matter of any one of Examples 1 to 3 can optionally include wherein the routing control circuitry is configured to change the reconfigurable routing configuration during the plurality of computation stages to calculate the transform of the input sequence as a Fourier transform of the input sequence.

In Example 6, the subject matter of any one of Examples 1 to 5 can optionally include wherein the plurality of butterfly computation circuits are configured to perform Decimation in Frequency (DIF) Fast Fourier Transform (FFT) butterfly computations or Decimation in Time (DIT) FFT butterfly computations.

In Example 7, the subject matter of any one of Examples 1 to 6 can optionally further include a memory configured to store a plurality of complex coefficients, wherein each of the plurality of butterfly computation circuits are configured to receive a respective complex coefficient from the memory and to apply the respective complex coefficient in the respective butterfly computation.

In Example 8, the subject matter of Example 7 can optionally include wherein the plurality of complex coefficients are a plurality of twiddle factors for a Fast Fourier Transform (FFT) algorithm.

In Example 9, the subject matter of Example 7 or 8 can optionally include wherein the memory is configured to store the plurality of complex coefficients as a lookup table.

In Example 10, the subject matter of any one of Examples 1 to 9 can optionally include wherein the routing control circuitry is configured to receive the outputs of the plurality of butterfly computation circuits as a plurality of routing network inputs at each antecedent computation stage and route each of the plurality of routing network inputs via the wired routing network to the plurality of butterfly computation circuits according to the reconfigurable routing configuration.

In Example 11, the subject matter of Example 10 can optionally include wherein the routing control circuitry is configured to route each of the plurality of routing network inputs via the wired routing network to a respective specific butterfly computation circuit of the plurality of butterfly computation circuits according to the reconfigurable routing configuration.

In Example 12, the subject matter of Example 10 can optionally include wherein the routing control circuitry is configured to select a routing path via the wired routing network for each of the plurality of routing network inputs according to the reconfigurable routing configuration.

In Example 13, the subject matter of Example 10 can optionally include wherein the routing control circuitry includes a plurality of input multiplexers, and wherein each of the plurality of input multiplexers is configured to receive a respective routing network input of the routing network inputs and route the respective routing network input via the wired routing network to a respective destination butterfly computation circuit of the plurality of butterfly computation circuits according to the reconfigurable routing configuration.

In Example 14, the subject matter of Example 13 can optionally include wherein the plurality of input multiplexers are configured to receive a control signal specifying the reconfigurable routing configuration.

In Example 15, the subject matter of any one of Examples 1 to 13 can optionally include wherein the routing control circuitry is configured to receive a control signal specifying the reconfigurable routing configuration during each of the plurality of computation stages.

In Example 16, the subject matter of Example 15 can optionally include wherein the routing control circuitry is configured to route each output of the plurality of butterfly computation circuits via the wired routing network to a respective specific butterfly computation circuit of the plurality of butterfly computation circuits according to the reconfigurable routing configuration.

In Example 17, the subject matter of any one of Examples 1 to 16 can optionally include wherein the plurality of butterfly computation circuits are configured to perform the butterfly computations of each of the plurality of computation stages in parallel.

In Example 18, the subject matter of any one of Examples 1 to 17 can optionally further include a plurality of result memories each coupled to a respective butterfly computation circuit of the plurality of butterfly computation circuits, wherein each of the plurality of result memories are configured to store the output of the respective butterfly computation circuit for a most recent computation stage of the plurality of computation stages.

In Example 19, the subject matter of any one of Examples 1 to 18 can optionally include wherein the plurality of butterfly computation circuits are configured to output the transform of the input sequence in bit-reversed index order after the final computation stage of the plurality of computation stages.

In Example 20, the subject matter of Example 19 can optionally include wherein the plurality of butterfly computation circuits are configured to execute a reordering stage following the final computation stage to reorder the transform of the input sequence to have correct order.

In Example 21, the subject matter of any one of Examples 1 to 17 can optionally include wherein each of the plurality of butterfly computation circuits are configured to selectively execute a bypass mechanism in which each of the plurality of butterfly computation circuits are configured to provide the unaltered input as the output of the butterfly computation circuit.

In Example 22, the subject matter of Example 21 can optionally include wherein the plurality of butterfly computation circuits are configured to execute the bypass mechanism during a reordering stage.

In Example 23, the subject matter of Example 22 can optionally include wherein the reordering stage occurs immediately following the final computation stage of the plurality of computation stages.

In Example 24, the subject matter of Example 23 can optionally include wherein the wired routing network is configured to re-order the transform of the input sequence according to a predefined reordering scheme during the reordering stage.

In Example 25, the subject matter of any one of Examples 1 to 24 can optionally include wherein the wired routing network includes a plurality of interconnects, a plurality of driver circuits, and a plurality of receiver circuits, wherein a first driver circuit plurality of driver circuits is configured to provide a data signal across a first interconnect of the plurality of interconnects to a first receiver circuit of the plurality of receiver circuits.

In Example 26, the subject matter of Example 25 can optionally include wherein the first driver circuit is configured to provide the data signal across the first interconnect with a reduced dual-ended voltage swing.

In Example 27, the subject matter of any one of Examples 1 to 24 can optionally include wherein the wired routing network includes a plurality of interconnect circuits each configured to carry a data signal from an input of the wired routing network to an output of the wired routing network.

In Example 28, the subject matter of Example 27 can optionally include wherein a first interconnect circuit of the plurality of interconnect circuits includes a driver circuit, an interconnect wire, and a receiver circuit, and wherein the driver circuit is configured to provide the data signal across the interconnect wire to the receiver circuit with a reduced voltage swing.

In Example 29, the subject matter of Example 28 can optionally include wherein the driver circuit is configured to provide the data signal across the interconnect wire to the receiver circuit with a dual-ended reduced voltage swing relative to a supply voltage of the driver circuit and a ground voltage of the driver circuit.

In Example 30, the subject matter of Example 28 can optionally include wherein the driver circuit is configured to provide the data signal across the interconnect wire to the receiver circuit with a single-ended reduced voltage swing relative to a supply voltage of the driver circuit.

In Example 31, the subject matter of Example 28 can optionally include wherein the receiver circuit includes a feedback transistor configured to steer current from an interior node of the receiver circuit towards an input node of the receiver circuit.

In Example 32, the subject matter of Example 31 can optionally include wherein the receiver circuit further includes a clipper transistor positioned between the interconnect wire and the input node of the receiver circuit, wherein the clipper transistor is configured to clip a voltage swing across the interconnect wire to a reduced voltage below a supply voltage of the receiver circuit.

In Example 33, the subject matter of Example 32 can optionally include wherein the receiver circuit includes one or more further clipper transistors coupled in serial with the clipper transistor between the interconnect wire and the input node of the receiver circuit.

In Example 34, the subject matter of Example 28 can optionally include wherein the driver circuit includes a clipper device in a pull-down side of the driver circuit configured to prevent the voltage of an output node of the driver circuit from reaching a ground voltage of the driver circuit.

In Example 35, the subject matter of any one of Examples 1 to 34 can optionally include wherein the transform is a frequency transform.

In Example 36, the subject matter of any one of Examples 1 to 34 can optionally include wherein the transform is a Fourier transform.

In Example 37, the subject matter of any one of Examples 1 to 34 can optionally include wherein the transform is a Fast Fourier Transform (FFT).

Example 38 is a mobile communication device including the calculation circuit of any one of Examples 1 to 37.

Example 39 is a method of calculating a transform of an input sequence, the method including performing a butterfly computation at each of a plurality of butterfly computation circuits on a respective plurality of inputs to produce a plurality of outputs during each of a plurality of computation stages, routing the plurality of outputs from each antecedent computation stage of the plurality of computation stages via a wired routing network as inputs to the plurality of butterfly computation circuits in each subsequent computation stage of the plurality of computation stages according to a reconfigurable routing configuration, and adjusting the reconfigurable routing configuration during the plurality of computation stages according to the transform.

In Example 40, the subject matter of Example 39 can optionally include wherein the adjusting the reconfigurable routing configuration during the plurality of computation stages according to the transform includes adjusting the reconfigurable routing configuration for each of the plurality of computation stages.

In Example 41, the subject matter of Example 39 or 40 can optionally further include generating the transform of the input sequence following the final computation stage of the plurality of computation stages.

In Example 42, the subject matter of any one of Examples 39 to 41 can optionally include wherein the transform is a frequency transform/

In Example 43, the subject matter of any one of Examples 39 to 42 can optionally include wherein the transform is a Fourier transform/

In Example 44, the subject matter of any one of Examples 39 to 43 can optionally include wherein the transform is a Fast Fourier Transform (FFT).

In Example 45, the subject matter of any one of Examples 39 to 44 can optionally include wherein the performing a butterfly computation at each of a plurality of butterfly computation circuits on a respective plurality of inputs to produce a plurality of outputs during each of a plurality of computation stages includes performing a Decimation in Frequency (DIF) Fast Fourier Transform (FFT) butterfly computation or a Decimation in Time (DIT) FFT butterfly computation at each of the plurality of butterfly computation circuits to produce the plurality of outputs during each of the plurality of computation stages.

In Example 46, the subject matter of any one of Examples 39 to 45 can optionally further include retrieving one or more complex coefficients from a memory, providing the one or more complex coefficients to the plurality of butterfly computation circuits, and wherein the performing a butterfly computation at each of a plurality of butterfly computation circuits on a respective plurality of inputs to produce a plurality of outputs during each of a plurality of computation stages includes performing the butterfly computation at each of the plurality of butterfly circuits with the one or more complex coefficients.

In Example 47, the subject matter of Example 46 can optionally include wherein the plurality of complex coefficients are a plurality of twiddle factors for a Fast Fourier Transform (FFT) algorithm.

In Example 48, the subject matter of Example 46 or 47 can optionally further include storing the plurality of complex coefficients in the memory as a lookup table.

In Example 49, the subject matter of any one of Examples 39 to 48 can optionally include wherein the routing the plurality of outputs from each antecedent computation stage of the plurality of computation stages via a wired routing network as inputs to the plurality of butterfly computation circuits in each subsequent computation stage of the plurality of computation stages according to a reconfigurable routing configuration includes receiving the plurality of outputs as a plurality of routing network inputs at each antecedent computation stage and routing each of the plurality of routing network inputs via the wired routing network to the plurality of butterfly computation circuits according to the reconfigurable routing configuration.

In Example 50, the subject matter of Example 49 can optionally include wherein the routing each of the plurality of routing network inputs via the wired routing network to the plurality of butterfly computation circuits according to the reconfigurable routing configuration includes routing each of the plurality of routing network inputs via the wired routing network to a respective specific butterfly computation circuit of the plurality of butterfly computation circuits according to the reconfigurable routing configuration.

In Example 51, the subject matter of Example 49 can optionally include wherein the routing each of the plurality of routing network inputs via the wired routing network to the plurality of butterfly computation circuits according to the reconfigurable routing configuration includes selecting a routing path via the wired routing network for each of the plurality of routing network inputs according to the reconfigurable routing configuration.

In Example 52, the subject matter of any one of Examples 39 to 51 can optionally include wherein the adjusting the reconfigurable routing configuration during the plurality of computation stages according to the transform includes adjusting the reconfigurable routing configuration during each of the plurality of computation stages according to a control signal.

In Example 53, the subject matter of Example 52 can optionally include wherein the performing a butterfly computation at each of a plurality of butterfly computation circuits on a respective plurality of inputs to produce a plurality of outputs during each of a plurality of computation stages includes performing the butterfly computation at each of the plurality of butterfly computation circuits in parallel.

In Example 54, the subject matter of any one of Examples 39 to 53 can optionally further include storing the plurality of outputs in of the plurality of butterfly computation circuits in a plurality of result memories each coupled to a respective butterfly computation circuit of the plurality of butterfly computation circuits.

In Example 55, the subject matter of Example 54 can optionally include wherein the storing the plurality of outputs in of the plurality of butterfly computation circuits in a plurality of result memories includes storing the plurality of outputs from the a most recent computation stage of the plurality of computation stages in the plurality of result memories.

In Example 56, the subject matter of any one of Examples 39 to 55 can optionally further include outputting the transform of the input sequence from the plurality of butterfly computation circuits in bit-reversed index order after the final computation stage of the plurality of computation stages.

In Example 57, the subject matter of Example 56 can optionally further include performing a reordering stage following the final computation stage to reorder the transform of the input sequence to have correct order.

In Example 58, the subject matter of any one of Examples 39 to 55 can optionally include wherein each of the plurality of butterfly computation circuits are configured to selectively execute a bypass mechanism in which each of the plurality of butterfly computation circuits are configured to provide the unaltered input as the output of the butterfly computation circuit, the method further including executing the bypass mechanism at each of the plurality of butterfly computation circuits during a reordering stage.

In Example 59, the subject matter of Example 58 can optionally include wherein the executing the bypass mechanism at each of the plurality of butterfly computation circuits during a reordering stage includes executing the reordering stage immediately following the final computation stage of the plurality of computation stages.

Example 60 is a calculation circuit configured to perform the method of any one of Examples 39 to 59.

Example 61 is a mobile communication device including the calculation circuit of Example 60.

Example 62 is a calculation circuit for calculating a transform of an input sequence, the calculation circuit including a plurality of butterfly computation circuits configured to perform a plurality of butterfly computations and to produce a plurality of outputs during each of a plurality of computation stages, a wired routing network configured to route a first plurality of outputs of the plurality of butterfly computation circuits from a first computation stage of the plurality of computation stages as input to the plurality of butterfly computation circuits during a second computation stage of the plurality of computation stages according to a reconfigurable routing configuration, and routing control circuitry configured to modify the reconfigurable routing configuration for a third computation stage of the plurality of computation stages.

In Example 63, the subject matter of Example 62 can optionally include wherein the plurality of butterfly computation circuits are configured to output the first plurality of outputs during the first computation stage.

In Example 64, the subject matter of Example 62 or 63 can optionally include wherein the plurality of butterfly computation circuits are configured to output a second plurality of outputs from the second computation stage, wherein the wired routing network is configured to route the second plurality of outputs as input to the plurality of butterfly computation circuits during the third computation stage according to the modified reconfigurable routing configuration.

In Example 65, the subject matter of any one of Examples 62 to 64 can optionally include wherein the routing control circuitry is configured to modify the reconfigurable routing configuration during each of the plurality of computation stages according to the transform.

In Example 66, the subject matter of any one of Examples 62 to 64 can optionally include wherein the routing control circuitry is configured to modify the reconfigurable routing configuration during each of the plurality of computation stages to calculate the transform of the input sequence as a Fast Fourier Transform (FFT) of the input sequence.

In Example 67, the subject matter of any one of Examples 62 to 64 can optionally include wherein the routing control circuitry is configured to modify the reconfigurable routing configuration during each of the plurality of computation stages to calculate the transform of the input sequence as a Fourier transform of the input sequence.

In Example 68, the subject matter of any one of Examples 62 to 67 can optionally include wherein the plurality of butterfly computation circuits are configured to perform Decimation in Frequency (DIF) Fast Fourier Transform (FFT) butterfly computations or Decimation in Time (DIT) FFT butterfly computations.

In Example 69, the subject matter of any one of Examples 62 to 68 can optionally include wherein the plurality of butterfly computation circuits are configured to output the transform of the input sequence following the final computation stage of the plurality of computation stages.

In Example 70, the subject matter of any one of Examples 62 to 69 can optionally further include a memory configured to store a plurality of complex coefficients, wherein each of the plurality of butterfly computation circuits are configured to receive a respective complex coefficient from the memory and to apply the respective complex coefficient for the plurality of butterfly computations.

In Example 71, the subject matter of Example 70 can optionally include wherein the plurality of complex coefficients are a plurality of twiddle factors for a Fast Fourier Transform (FFT) algorithm.

In Example 72, the subject matter of Example 70 can optionally include wherein the memory is configured to store the plurality of complex coefficients as a lookup table.

In Example 73, the subject matter of any one of Examples 62 to 72 can optionally include wherein the routing control circuitry is configured to route each of the first plurality of outputs via the wired routing network to a respective butterfly computation circuit of the plurality of butterfly computation circuits according to the reconfigurable routing configuration.

In Example 74, the subject matter of Example 73 can optionally include wherein the routing control circuitry is configured to select a routing path via the wired routing network for each of the first plurality of outputs according to the reconfigurable routing configuration.

In Example 75, the subject matter of any one of Examples 62 to 74 can optionally include wherein the routing control circuitry includes a plurality of input multiplexers, and wherein each of the plurality of input multiplexers is configured to receive a respective output of the first plurality of outputs and route the respective output via the wired routing network to a respective destination butterfly computation circuit of the plurality of butterfly computation circuits according to the reconfigurable routing configuration.

In Example 76, the subject matter of Example 75 can optionally include wherein the plurality of input multiplexers are configured to receive a control signal specifying the reconfigurable routing configuration.

In Example 77, the subject matter of any one of Examples 62 to 76 can optionally include wherein the routing control circuitry is configured to receive a control signal specifying the reconfigurable routing configuration during each of the plurality of computation stages.

In Example 78, the subject matter of Example 77 can optionally include wherein the routing control circuits is configured to route each of the first plurality of outputs via the wired routing network to a respective destination butterfly computation circuit of the plurality of butterfly computation circuits according to the reconfigurable routing configuration.

In Example 79, the subject matter of any one of Examples 62 to 79 can optionally include wherein the plurality of butterfly computation circuits are configured to perform the plurality of butterfly computations of each of the plurality of computation stages in parallel.

In Example 80, the subject matter of any one of Examples 62 to 79 can optionally further include a plurality of result memories each coupled to a respective butterfly computation circuit of the plurality of butterfly computation circuits, wherein each of the plurality of result memories are configured to store a respective output of the first plurality of outputs.

In Example 81, the subject matter of any one of Examples 62 to 80 can optionally include wherein each of the plurality of butterfly computation circuits are configured to output the transform of the input sequence in bit-reversed index order after the final computation stage of the plurality of computation stages.

In Example 82, the subject matter of Example 81 can optionally include wherein the plurality of butterfly computation circuits are configured to execute a reordering stage following the final computation stage to reorder the transform of the input sequence to have correct order.

In Example 83, wherein the plurality of butterfly computation circuits are configured to selectively execute a bypass mechanism in which each respective butterfly computation circuit of the plurality of butterfly computation circuits are configured to provide an unaltered input of the respective butterfly computation circuit as an output of the butterfly computation circuit.

In Example 84, the subject matter of Example 83 can optionally include wherein the plurality of butterfly computation circuits are configured to execute the bypass mechanism during a reordering stage.

In Example 85, the subject matter of Example 84 can optionally include wherein the reordering stage occurs immediately following the final computation stage of the plurality of computation stages.

In Example 86, the subject matter of Example 84 or 85 can optionally include wherein the wired routing network is configured to reorder the transform of the input sequence according to a predefined reordering scheme during the reordering stage.

In Example 87, the subject matter of any one of Examples 62 to 86 can optionally include wherein the wired routing network includes a plurality of interconnects, a plurality of driver circuits, and a plurality of receiver circuits, wherein a first driver circuit of the plurality of driver circuits is configured to provide a data signal across a first interconnect of the plurality of interconnects to a first receiver circuit of the plurality of receiver circuits.

In Example 88, the subject matter of Example 87 can optionally include wherein the first driver circuit is configured to provide the data signal across the first interconnect with a reduced dual-ended voltage swing.

In Example 89, wherein the wired routing network includes a plurality of interconnect circuits each configured to carry a data signal from an input of the wired routing network to an output of the wired routing network.

In Example 90, the subject matter of Example 89 can optionally include wherein a first interconnect of the plurality of interconnect circuits includes a driver circuit, an interconnect circuit, and a receiver circuit, and wherein the driver circuit is configured to provide the data signal across the interconnect wire to the receiver circuit with a reduced voltage swing.

In Example 91, the subject matter of Example 90 can optionally include wherein the driver circuit is configured to provide the data signal across the interconnect wire to the receiver circuit with a dual-ended reduced voltage swing relative to a supply voltage of the driver circuit and a ground voltage of the driver circuit.

In Example 92, the subject matter of Example 90 can optionally include wherein the driver circuit is configured to provide the data signal across the interconnect wire to the receiver circuit with a single-ended reduced voltage swing relative to a supply voltage of the driver circuit.

In Example 93, the subject matter of Example 90 can optionally include wherein the receiver circuit includes a feedback transistor configured to steer current from an interior node of the receiver circuit towards an input node of the receiver circuit.

In Example 94, the subject matter of Example 93 can optionally include wherein the receiver circuit further includes a clipper transistor positioned between the interconnect wire and the input node of the receiver circuit, wherein the clipper transistor is configured to clip a voltage swing across the interconnect wire to a reduced voltage below a supply voltage of the receiver circuit.

In Example 95, the subject matter of Example 94 can optionally include wherein the receiver circuit includes one or more further clipper transistors coupled in serial with the clipper transistor between the interconnect wire and the input node of the receiver circuit.

In Example 96, the subject matter of Example 90 can optionally include wherein the driver circuit includes a clipper device in a pull-down side of the driver circuit configured to prevent the voltage of an output node of the driver circuit from reaching a ground voltage of the driver circuit.

In Example 97, the subject matter of any one of Examples 62 to 96 can optionally include wherein the transform is a frequency transform.

In Example 98, the subject matter of any one of Examples 62 to 97 can optionally include wherein the transform is a Fourier transform.

In Example 99, the subject matter of any one of Examples 62 to 98 can optionally include wherein the transform is a Fast Fourier Transform (FFT).

Example 100 is a mobile communication device including the calculation circuit of any one of Examples 62 to 99.

Example 101 is a method of calculating a transform of an input sequence, the method including performing a plurality of butterfly computations at a plurality of butterfly computation circuits to produce a plurality of outputs during each of a plurality of computation stages, routing a first plurality of outputs of the plurality of butterfly computation circuits from a first computation stage of the plurality of computation stages as input to the plurality of butterfly computation circuits during a second computation stage of the plurality of computation stages according to a reconfigurable routing configuration, and modifying the reconfigurable routing configuration for a third computation stage of the plurality of computation stages.

In Example 102, the subject matter of Example 101 can optionally further include generating the first plurality of outputs with the plurality of butterfly computation circuits during the first computation stage.

In Example 103, the subject matter of Example 101 or 102 can optionally further include generating a second plurality of outputs with the plurality of butterfly computation circuits during the second computation stage, wherein the wired routing network is configured to route the second plurality of outputs as input to the plurality of butterfly computation circuits during the third computation stage according to the reconfigurable routing configuration.

In Example 104, the subject matter of any one of Examples 101 to 103 can optionally further include modifying the reconfigurable routing configuration during each of the plurality of computation stages according to the transform.

In Example 105, the subject matter of any one of Examples 101 to 104 can optionally further include modifying the reconfigurable routing configuration during each of the plurality of computation stages to calculate the transform of the input sequence as a Fast Fourier Transform (FFT) of the input sequence.

In Example 106, the subject matter of any one of Examples 101 to 105 can optionally further include modifying the reconfigurable routing configuration during each of the plurality of computation stages to calculate the transform of the input sequence as a Fourier transform of the input sequence.

In Example 107, the subject matter of any one of Examples 101 to 106 can optionally include wherein the performing a plurality of butterfly computations at a plurality of butterfly computation circuits to produce a plurality of outputs during each of a plurality of computation stages includes performing a plurality of Decimation in Frequency (DIF) Fast Fourier Transform (FFT) butterfly computations or a plurality of Decimation in Frequency (DIT) FFT butterfly computations.

In Example 108, the subject matter of any one of Examples 101 to 107 can optionally further include generating the transform of the input sequence from the plurality of butterfly computation circuits following the final computation stage of the plurality of computation stages.

In Example 109, the subject matter of any one of Examples 101 to 108 can optionally further include storing a plurality of complex coefficients in a memory, and wherein the performing a plurality of butterfly computations at a plurality of butterfly computation circuits to produce a plurality of outputs during each of a plurality of computation stages includes providing a respective complex coefficient to each respective butterfly computation circuit of the plurality of butterfly computation circuits from the memory and applying the respective complex coefficients to perform the plurality of butterfly computations.

In Example 110, the subject matter of Example 109 can optionally include wherein the plurality of complex coefficients are a plurality of twiddle factors for a Fast Fourier Transform (FFT) algorithm.

In Example 111, the subject matter of Example 109 or 110 can optionally include wherein the storing a plurality of complex coefficients in a memory includes storing the plurality of complex coefficients as a lookup table in the memory.

In Example 112, the subject matter of any one of Examples 101 to 111 can optionally include wherein the routing a first plurality of outputs of the plurality of butterfly computation circuits from a first computation stage of the plurality of computation stages as input to the plurality of butterfly computation circuits during a second computation stage of the plurality of computation stages according to a reconfigurable routing configuration includes routing each of the first plurality of outputs via the wired routing network to a respective butterfly computation circuit of the plurality of butterfly computation circuits according to the reconfigurable routing configuration.

In Example 113, the subject matter of Example 112 can optionally further include selecting a routing path via the routing network for each of the first plurality of outputs according to the reconfigurable routing configuration.

In Example 114, the subject matter of any one of Examples 101 to 113 can optionally include wherein the modifying the reconfigurable routing configuration for a third computation stage of the plurality of computation stages includes modifying the reconfigurable routing configuration for the third computation stage according to a control signal.

In Example 115, the subject matter of any one of Examples 101 to 114 can optionally include wherein the performing a plurality of butterfly computations at a plurality of butterfly computation circuits to produce a plurality of outputs during each of a plurality of computation stages includes performing the plurality of butterfly computations in parallel during each of the plurality of computation stages.

In Example 116, the subject matter of any one of Examples 101 to 115 can optionally further include storing the first plurality of outputs in a plurality of result memories coupled to the plurality of butterfly computation circuits.

In Example 117, the subject matter of any one of Examples 101 to 116 can optionally further include generating the transform of the input sequence in bit-reversed index order after the final computation stage of the plurality of computation stages.

In Example 118, the subject matter of Example 117 can optionally further include executing a reordering stage with the plurality of butterfly computation circuits to reorder to transform of the input sequence to have correct order.

In Example 119, the subject matter of any one of Examples 101 to 115 can optionally include wherein the plurality of butterfly computation circuits are configured to selectively execute a bypass mechanism in which each respective butterfly computation circuit of the plurality of butterfly computation circuits are configured to provide an unaltered input of the respective butterfly computation circuit as an output of the butterfly computation circuit.

In Example 120, the subject matter of Example 119 can optionally further include executing the bypass mechanism at the plurality of butterfly computation circuits during a reordering stage.

In Example 121, the subject matter of Example 120 can optionally include wherein the reordering stages occurs immediately following the final computation stage of the plurality of computation stags.

In Example 122, the subject matter of any one of Examples 101 to 121 can optionally include wherein the transform is a frequency transform.

In Example 123, the subject matter of any one of Examples 101 to 122 can optionally include wherein the transform is a Fourier transform.

In Example 124, the subject matter of any one of Examples 101 to 123 can optionally include wherein the transform is a Fast Fourier Transform (FFT).

Example 125 is a calculation circuit configured to perform the method of any one of Examples 101 to 124.

Example 126 is a mobile communication device including the calculation circuit of Example 125.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A calculation circuit for calculating a transform of an input sequence, the calculation circuit comprising:
   a plurality of butterfly computation circuits configured to:
      perform a plurality of butterfly computations,
      produce a plurality of outputs during each computation stage of a plurality of computation stages, and
      selectively execute a bypass mechanism with a butterfly computation circuit of the plurality of butterfly computation circuits, such that the butterfly computation circuit provides an unaltered input of the butterfly computation circuit as an output of the butterfly computation circuit;
   a wired routing network configured to route a first plurality of outputs of the plurality of butterfly computation circuits from a first computation stage of the plurality of computation stages as input to the plurality of butterfly computation circuits during a second computation stage of the plurality of computation stages according to a reconfigurable routing configuration; and
   routing control circuitry configured to modify the reconfigurable routing configuration for a third computation stage of the plurality of computation stages.

2. The calculation circuit of claim 1,
   wherein the plurality of butterfly computation circuits are configured to output a second plurality of outputs from the second computation stage, and
   wherein the wired routing network is configured to route the second plurality of outputs as input to the plurality of butterfly computation circuits during the third computation stage according to the modified reconfigurable routing configuration.

3. The calculation circuit of claim 1,
wherein the routing control circuitry is configured to modify the reconfigurable routing configuration during each computation stage of the plurality of computation stages according to the transform.

4. The calculation circuit of claim 1,
wherein the routing control circuitry is configured to modify the reconfigurable routing configuration during each computation stage of the plurality of computation stages to calculate the transform of the input sequence as a Fast Fourier Transform (FFT) of the input sequence.

5. The calculation circuit of claim 1,
wherein the plurality of butterfly computation circuits are configured to perform Decimation in Frequency (DIF) Fast Fourier Transform (FFT) butterfly computations or Decimation in Time (DIT) FFT butterfly computations.

6. The calculation circuit of claim 1,
wherein the routing control circuitry is configured to route each first output of the first plurality of outputs via the wired routing network to a respective butterfly computation circuit of the plurality of butterfly computation circuits according to the reconfigurable routing configuration.

7. The calculation circuit of claim 1,
wherein the routing control circuitry comprises a plurality of input multiplexers, and
wherein each input multiplexor of the plurality of input multiplexers is configured to:
receive a respective output of the first plurality of outputs, and
route the respective output via the wired routing network to a respective destination butterfly computation circuit of the plurality of butterfly computation circuits according to the reconfigurable routing configuration.

8. The calculation circuit of claim 1,
wherein the routing control circuitry is configured to receive a control signal specifying the reconfigurable routing configuration during each computation stage of the plurality of computation stages.

9. The calculation circuit of claim 1,
wherein each butterfly computation circuit of the plurality of butterfly computation circuits are configured to output the transform of the input sequence in bit-reversed index order after a final computation stage of the plurality of computation stages.

10. The calculation circuit of claim 9,
wherein the plurality of butterfly computation circuits are configured to execute a reordering stage following the final computation stage to reorder the transform of the input sequence to have correct order.

11. The calculation circuit of claim 1,
wherein the wired routing network comprises a plurality of interconnect circuits, and
wherein each interconnect circuit of the plurality of interconnect circuits is configured to carry a data signal from an input of the wired routing network to an output of the wired routing network.

12. The calculation circuit of claim 11,
wherein a first interconnect of the plurality of interconnect circuits comprises:
a driver circuit,
an interconnect wire, and
a receiver circuit; and
wherein the driver circuit is configured to provide the data signal across the interconnect wire to the receiver circuit with a reduced voltage swing.

13. The calculation circuit of claim 12,
wherein the receiver circuit comprises a feedback transistor configured to steer current from an interior node of the receiver circuit towards an input node of the receiver circuit.

14. The calculation circuit of claim 13,
wherein the receiver circuit further comprises a clipper transistor between the interconnect wire and the input node of the receiver circuit,
wherein the clipper transistor is configured to clip a voltage swing across the interconnect wire to a reduced voltage below a supply voltage of the receiver circuit.

15. The calculation circuit of claim 14,
wherein the receiver circuit further comprises one or more further clipper transistors coupled in serial with the clipper transistor between the interconnect wire and the input node of the receiver circuit.

16. The calculation circuit of claim 12,
wherein the driver circuit comprises a clipper device in a pull-down side of the driver circuit, and
wherein the clipper device is configured to prevent the voltage of an output node of the driver circuit from reaching a ground voltage of the driver circuit.

17. A method of calculating a transform of an input sequence, the method comprising:
performing a plurality of butterfly computations at a plurality of butterfly computation circuits to produce a plurality of outputs during each computation stage of a plurality of computation stages;
routing a first plurality of outputs of the plurality of butterfly computation circuits from a first computation stage of the plurality of computation stages as input to the plurality of butterfly computation circuits during a second computation stage of the plurality of computation stages according to a reconfigurable routing configuration;
modifying the reconfigurable routing configuration for a third computation stage of the plurality of computation stages; and
selectively executing a bypass mechanism with one or more butterfly computation circuits of the plurality of butterfly computation circuits, such that each butterfly computation circuit of the one or more butterfly computation circuits provides an unaltered input of the respective butterfly computation circuit as an output of the respective butterfly computation circuit.

18. The method of claim 17, further comprising:
modifying the reconfigurable routing configuration during each computation stage of the plurality of computation stages according to the transform.

19. The method of claim 17, further comprising:
modifying the reconfigurable routing configuration during each computation stage of the plurality of computation stages to calculate the transform of the input sequence as a Fast Fourier Transform (FFT) of the input sequence.

20. The method of claim 17,
wherein routing the first plurality of outputs of the plurality of butterfly computation circuits from the first computation stage of the plurality of computation stages as input to the plurality of butterfly computation circuits during the second computation stage of the plurality of computation stages according to the reconfigurable routing configuration comprises:
routing each first output of the first plurality of outputs via the wired routing network to a respective butterfly computation circuit of the plurality of butterfly computation circuits according to the reconfigurable routing configuration.

21. The method of claim 17,
wherein modifying the reconfigurable routing configuration for the third computation stage of the plurality of computation stages comprises:
modifying the reconfigurable routing configuration for the third computation stage according to a control signal.

22. A calculation circuit for calculating a transform of an input sequence, the calculation circuit comprising:
a plurality of butterfly computation circuits, wherein each butterfly computation circuit of the plurality of butterfly computation circuits is configured to:
perform a butterfly computation on a respective input of a plurality of inputs,
produce a respective output during each computation stage of a plurality of computation stages, and
selectively execute a bypass mechanism, such that a further respective input of the plurality of inputs is unaltered and provided as a further respective output during a reordering stage;
a wired routing network configured to route outputs of the plurality of butterfly computation circuits from each antecedent computation stage of the plurality of computation stages as inputs to the plurality of butterfly computation circuits in each subsequent computation stage of the plurality of computation stages according to a reconfigurable routing configuration; and
routing control circuitry configured to change the reconfigurable routing configuration during the plurality of computation stages according to the transform.

23. The calculation circuit of claim 22,
wherein the plurality of butterfly computation circuits are further configured to output the transform of the input sequence following the final computation stage of the plurality of computation stages.

24. The calculation circuit of claim 22,
wherein the routing control circuitry is configured to change the reconfigurable routing configuration during the plurality of computation stages to calculate the transform of the input sequence as a Fast Fourier Transform (FFT) of the input sequence.

25. The calculation circuit of claim 22,
wherein the routing control circuitry is configured to:
receive the outputs of the plurality of butterfly computation circuits as a plurality of routing network inputs at each antecedent computation stage of the plurality of computation stages, and
route each routing network input of the plurality of routing network inputs via the wired routing network to the plurality of butterfly computation circuits according to the reconfigurable routing configuration.

* * * * *